United States Patent
Yu

(10) Patent No.: US 10,874,171 B1
(45) Date of Patent: Dec. 29, 2020

(54) METHOD FOR MANUFACTURING LIGHT-WEIGHT WATERPROOF SHOE/BOOT

(71) Applicant: Chih-Yung Yu, Taichung (TW)

(72) Inventor: Chih-Yung Yu, Taichung (TW)

(*) Notice: Subject to any disclaimer, the term of this patent is extended or adjusted under 35 U.S.C. 154(b) by 56 days.

(21) Appl. No.: 16/504,335

(22) Filed: Jul. 8, 2019

(51) Int. Cl.

| A43B 7/12 | (2006.01) |
|---|---|
| A43B 23/02 | (2006.01) |
| A43D 21/00 | (2006.01) |
| A43D 3/02 | (2006.01) |
| A43D 11/12 | (2006.01) |
| A43D 25/047 | (2006.01) |
| B32B 3/30 | (2006.01) |
| B32B 7/05 | (2019.01) |
| B32B 27/12 | (2006.01) |
| B32B 27/40 | (2006.01) |
| B32B 37/06 | (2006.01) |
| B32B 37/10 | (2006.01) |
| B32B 37/12 | (2006.01) |
| A43D 25/20 | (2006.01) |
| A43D 15/00 | (2006.01) |

(52) U.S. Cl.
CPC ........ *A43B 23/0235* (2013.01); *A43B 23/021* (2013.01); *A43B 23/025* (2013.01); *A43B 23/0245* (2013.01); *A43B 23/0255* (2013.01); *A43D 11/12* (2013.01); *A43D 15/00* (2013.01); *A43D 25/047* (2013.01); *A43D 25/20* (2013.01); *B32B 3/30* (2013.01); *B32B 7/05* (2019.01); *B32B 27/12* (2013.01); *B32B 27/40* (2013.01); *B32B 37/06* (2013.01); *B32B 37/10* (2013.01); *B32B 37/12* (2013.01); *B32B 2307/718* (2013.01); *B32B 2307/724* (2013.01); *B32B 2307/7265* (2013.01); *B32B 2307/73* (2013.01)

(58) Field of Classification Search
CPC ..... A43D 25/047; A43D 25/20; A43B 23/021
See application file for complete search history.

(56) References Cited

U.S. PATENT DOCUMENTS

| 2,549,985 A * | 4/1951 | Normington ........ | A43B 23/026 428/141 |
| 3,035,291 A * | 5/1962 | Bingham, Jr. ....... | A41B 11/007 12/142 RS |
| 4,651,444 A * | 3/1987 | Ours .................... | A43B 1/0027 12/142 T |

(Continued)

*Primary Examiner* — Jila M Mohandesi
(74) *Attorney, Agent, or Firm* — Leong C. Lei

(57) ABSTRACT

A method for manufacturing a light-weight waterproof shoe/boot includes steps of cutting waterproof leather, arranging and stacking vamp section, forming through hot pressing, sewing heel section, hot-pressing heel section, combining midsole, and injecting sole to accompany fabrication of a waterproof shoe/boot, in which fabrication of a vamp section and a shaft section is accomplished through hot pressing the waterproof leather that is coated with a hot-melt adhesive; a sewing line of a heel section is covered by a heel water-resistant plate that is attached thereto through hot pressing to provide an effect of waterproofness; and a sewing line between a midsole and the vamp section is covered by an upper rim of a sole to achieve an effect of waterproofness. The vamp section and the shaft section are made with the waterproof leather that is light and thin so that the weight of the waterproof shoe/boot is greatly reduced.

16 Claims, 21 Drawing Sheets

(56) References Cited

U.S. PATENT DOCUMENTS

| | | | | |
|---|---|---|---|---|
| 5,345,638 | A | * | 9/1994 | Nishida .................... A41H 3/08 |
| | | | | 12/146 C |
| 6,558,784 | B1 | * | 5/2003 | Norton .................... A43B 5/002 |
| | | | | 12/146 C |
| 10,470,517 | B2 | * | 11/2019 | Chang .................... A43B 13/32 |
| 2007/0043630 | A1 | * | 2/2007 | Lyden .................. A43B 3/0078 |
| | | | | 705/26.41 |
| 2007/0199210 | A1 | * | 8/2007 | Vattes .................... A43B 7/085 |
| | | | | 36/45 |
| 2018/0015686 | A1 | * | 1/2018 | Chang ....................... B32B 5/18 |

* cited by examiner

METHOD FOR MANUFACTURING LIGHT-WEIGHT WATERPROOF SHOE/BOOT

TECHNICAL FIELD OF THE INVENTION

The present invention relates to a method for manufacturing a light-weight waterproof shoe or boot, and more particularly to a method that accomplishes fabrication of a vamp section and shaft section by subjecting a piece of waterproof leather that is coated with a waterproof hot-melt adhesive to hot pressing, in which a sewing line of a heel section is covered by a heel water-resistant plate attached thereto through hot pressing so as to provide an effect of water resistance, and a sewing line between a midsole and the vamp section is covered by an upper rim of an outer contour of a sole to achieve an effect of water resistance, and the vamp section and the shaft section are made of the waterproof leather that is light and thin so that a waterproof shoe/boot made with the present invention may greatly reduce the weight thereof.

DESCRIPTION OF THE PRIOR ART

People often take certain working or leisure activities in daily living, and proper footwears, such as boots, must be worn in order to capably carry out such activities. Boots for such purposes must qualify by possessing features of wear resistance, water resistance, light weight, and softness or flexibility. For such requirements, the Applicant proposed, in Chinese Patent No. 201610019912.2 filed on Jan. 13, 2016, a process for manufacturing rubber footwears. The process is applicable to fabrication of rubber footwears showing the characteristics of being wear resistant, waterproof, light in weight, and soft, and various diversified models are available for such rubber footwear. However, such a rubber footwear involves decorative pieces each of which has a certain thickness, and this makes the footwear heavy.

Further, with reference to FIG. 21, which shows a known rubber boot 70. The known rubber boot 70 includes a decorative piece 71 that is attached to the boot from a vamp section 62 to a shaft section 73 by sewing. This makes ineffective in resisting water.

SUMMARY OF THE INVENTION

The primary objective of the present invention is to make a product of shoe or boot that features light weight and waterproofness.

To achieve the above objective, the present invention provides a method that at least comprises the following steps:

a first step of cutting, in which a piece of waterproof leather that has a back side coated with a water-resistant hot-melt adhesive is subjected to a cutting operation to make at least a vamp water-resistant plate, one to multiple vamp decorative plates, and a heel water-resistant plate, and selectively and additionally make a shaft water-resistant plate and one to multiple shaft decorative plates, wherein the vamp water-resistant plate has one side edge that is recessed inwardly to form a first insertion opening and the shaft water-resistant plate has one side edge that is formed with a shaft arc opening;

a second step of arranging pattern of vamp section, in which the vamp water-resistant plate and the one to multiple vamp decorative plates that are formed with the cutting operation in the previous step are arranged and stacked on a vamp lining plate that is in a planar form, and selectively and additionally, the shaft water-resistant plate and the one to multiple shaft decorative plates that are formed with the cutting operation in the previous step is arranged and stacked on a shaft lining plate, wherein the vamp lining plate has a side edge that is recessed inwardly to form a second insertion opening, such that the second insertion opening is in alignment with and overlaps the first insertion opening of the vamp water-resistant plate; and the shaft lining plate is formed with a lining arc opening on a side edge thereof corresponding to that of the shaft water-resistant plate that is formed with the shaft arc opening, wherein the shaft water-resistant plate is longer than the shaft lining plate such that the shaft arc opening of the shaft water-resistant plate projects beyond and is located outside the lining arc opening of the shaft lining plate, and a portion of shaft hot-melt adhesive that is located along a peripheral edge of the shaft arc opening is not covered by the shaft lining plate;

a third step of hot pressing, in which the vamp lining plate and the vamp water-resistant plate, and the vamp decorative plates that are arranged and stacked thereon are placed in a hot pressing apparatus for hot pressing, such that the hot-melt adhesive layer on the back sides of the vamp water-resistant plate and the vamp decorative plates are heated and melted to combine with the vamp lining plate as a unitary combination, and portions of the vamp water-resistant plate and the vamp decorative plates that are stacked on each other are combined together as a unitary combination so as to form a water-resistant vamp section; and selectively and additionally, the shaft lining plate and the shaft water-resistant plate arranged and stacked thereon are placed in the hot pressing apparatus for hot pressing, such that the hot-melt adhesive layer on the back side of the shaft water-resistant plate is heated and melted to combine with the shaft lining plate as a unitary combination to form a water-resistant shaft section;

a fourth step of combining vamp section and shaft section, in which a portion of the hot-melt adhesive that is located along a peripheral edge of the shaft arc opening of the shaft section is stacked on a peripheral edge of the first insertion opening of the vamp water-resistant plate of the vamp section formed in the previous steps and is subjected to hot pressing such that the portion of the shaft hot-melt adhesive that is located along the peripheral edge of the shaft arc opening of the shaft section is heated and melted to combine the shaft section and the vamp section to each other, wherein the step can be omitted if the method is used to make a shoe that does not have a shaft;

a fifth step of sewing heel section, in which vamp outer edges of the vamp section at two opposite sides of the first insertion opening are jointed to each other and are sewn together so that the vamp section and the shaft section form a three-dimensional configuration, wherein, in case that the method is used to make a boot that has a shaft, shaft outer edges of two opposite sides of the shaft section are jointed to each other and are sewn together, and wherein an opposite end of the shaft section forms a shaft opening that is connected to and in communication with the first insertion opening of the vamp section; and portions around two sides of the sewn sites of the vamp section and the shaft section form a heel section;

a sixth step of hot-pressing heel section, in which the heel water-resistant plate that is made in the cutting operation of the first step is set on and covering the sewing line of the vamp section and the shaft section and is subjected to hot pressing, so that the hot-melt adhesive on the back side of the heel water-resistant plate is heated and melted and combines with the vamp section and the shaft section to form a unitary combination, and a joint site that is between the heel water-resistant plate and the vamp section and the shaft section is made a waterproof interface therebetween;

a seventh step of combining midsole, in which a midsole is attached to and combined with a bottom of the vamp section by means of sewing or adhesive to form a semi-finished product; and an eighth step of injecting sole, in which the semi-finished product is fit to a multi-segment last of an injection apparatus and a first mold member, a second mold member, and a third mold member are closed to enclose the semi-finished product, such that after the third mold member is closed, a sole gap is formed between a third mold cavity of the third mold member and the midsole of the semi-finished product; and a sole material that is heated and melted is injected into the third mold cavity of the third mold member to form a sole, wherein the sole material that is injected into the third mold cavity combines with the midsole and covers a joint interface between the midsole and the vamp section so that after being cooled, a product is formed and removed to form a light-weight waterproof boot/shoe product, wherein the sole material at least comprises rubber of polyurethane (PU).

DETAILED DESCRIPTION OF THE PREFERRED EMBODIMENT

Figure 1:
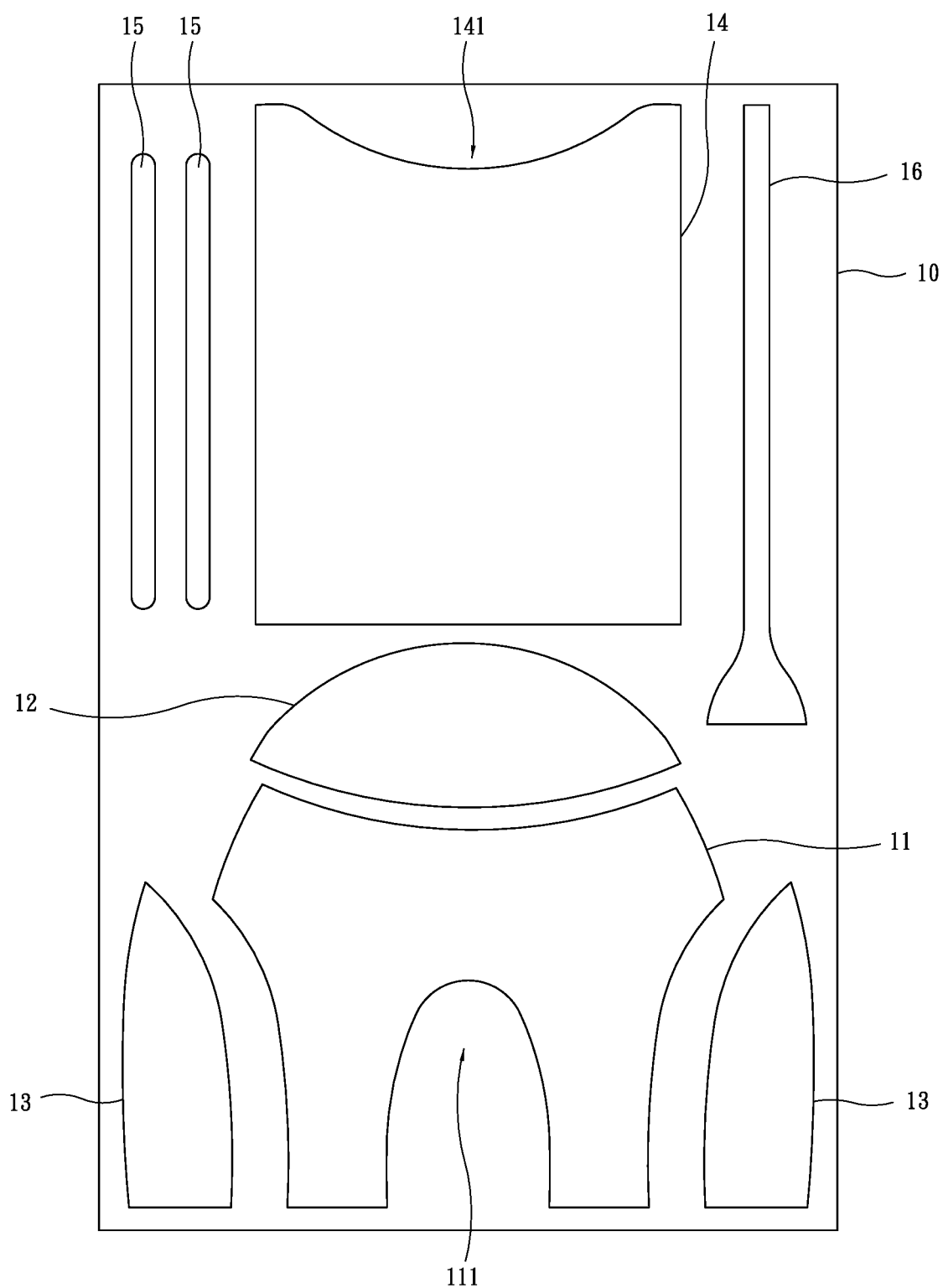
FIG. 1 is a schematic view illustrating an operation of cutting a waterproof leather sheet into various decorative plates according to a preferred embodiment of the present invention.
Figure 2:
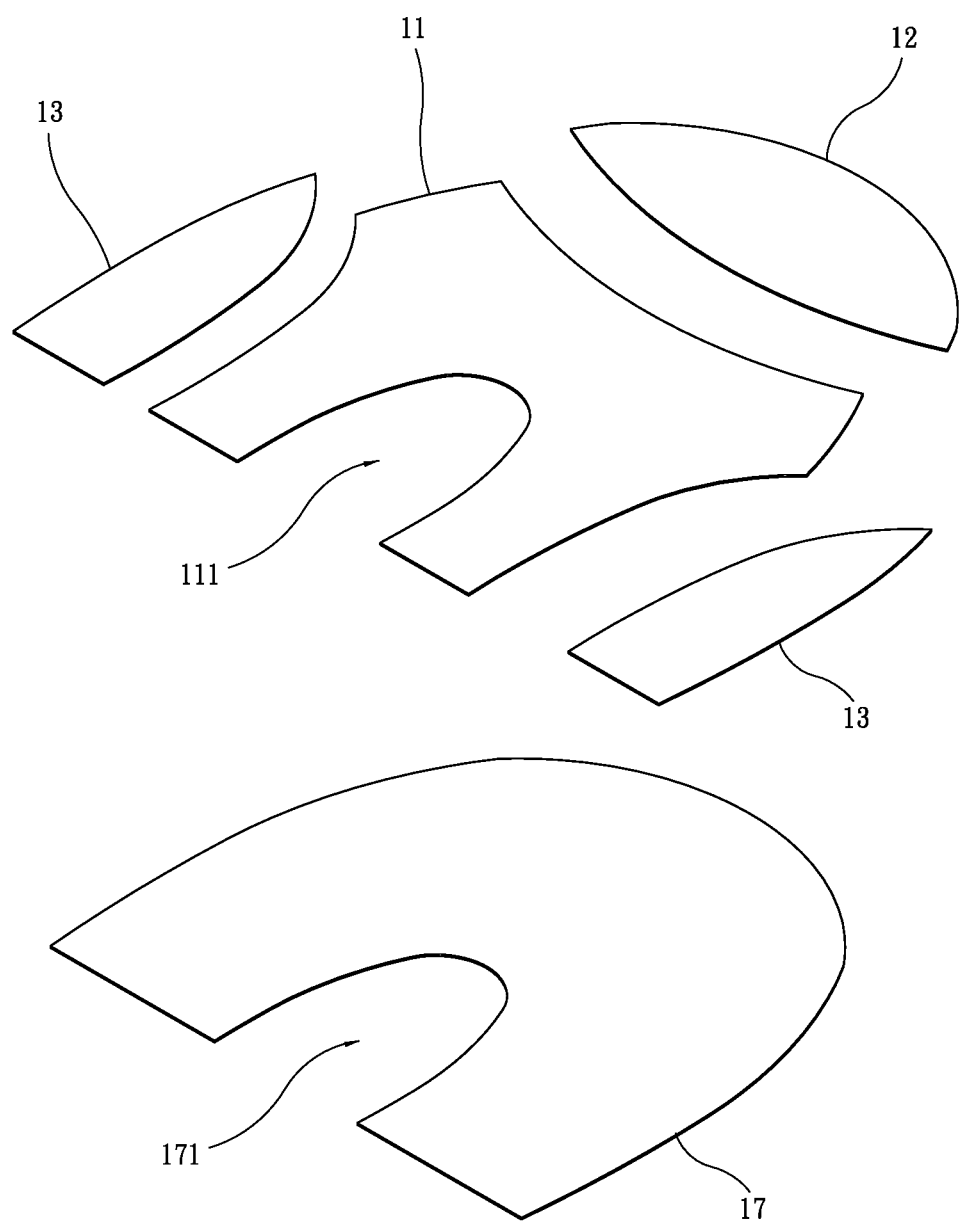
FIG. 2 is a schematic view showing parts, which jointly constitute a vamp section according to the preferred embodiment of the present invention, in a separated form.
Figure 3:
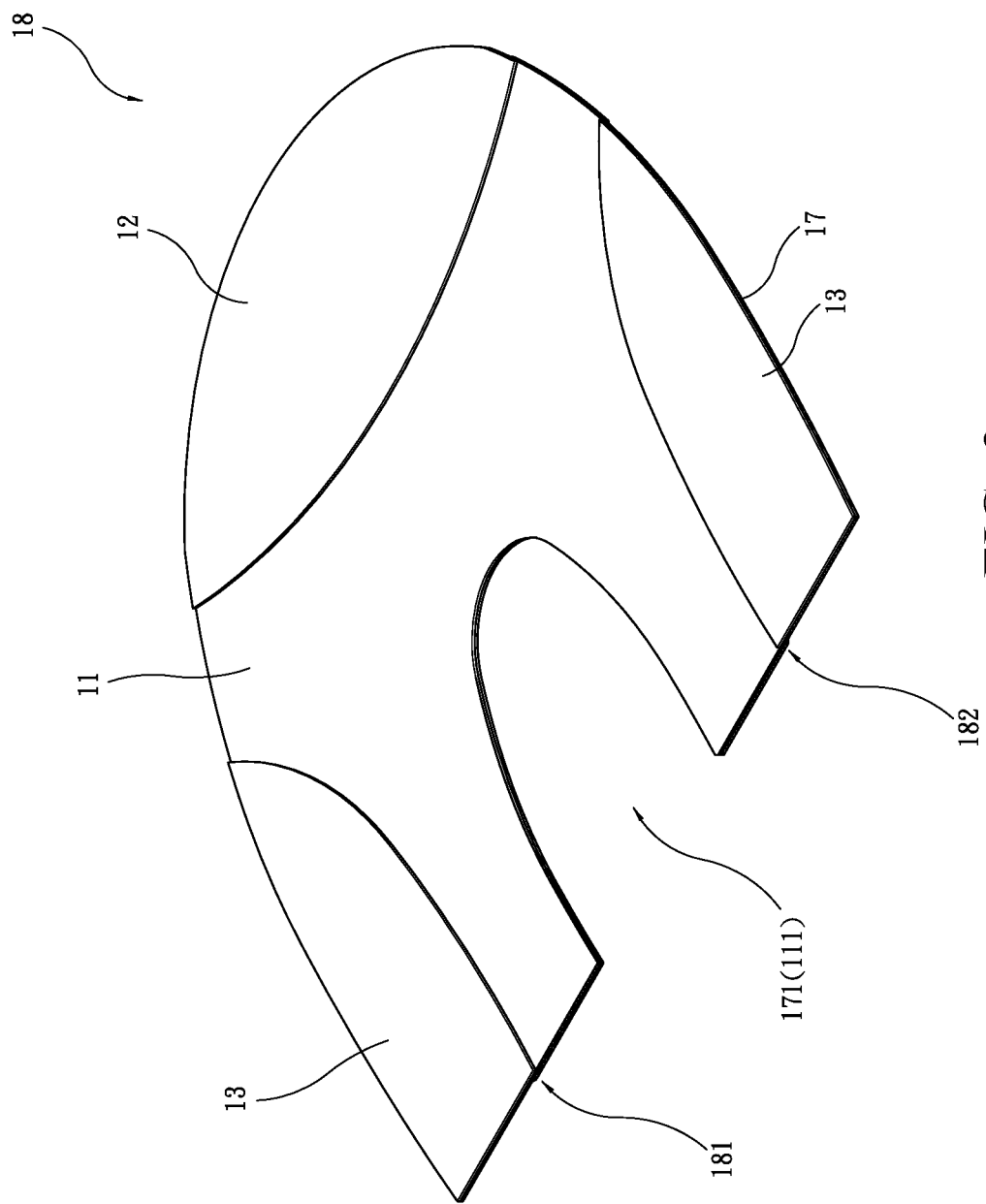
FIG. 3 is a schematic view illustrating the constituent parts of the vamp section that are stacked on each other according to the preferred embodiment before hot pressing.
Figure 4:
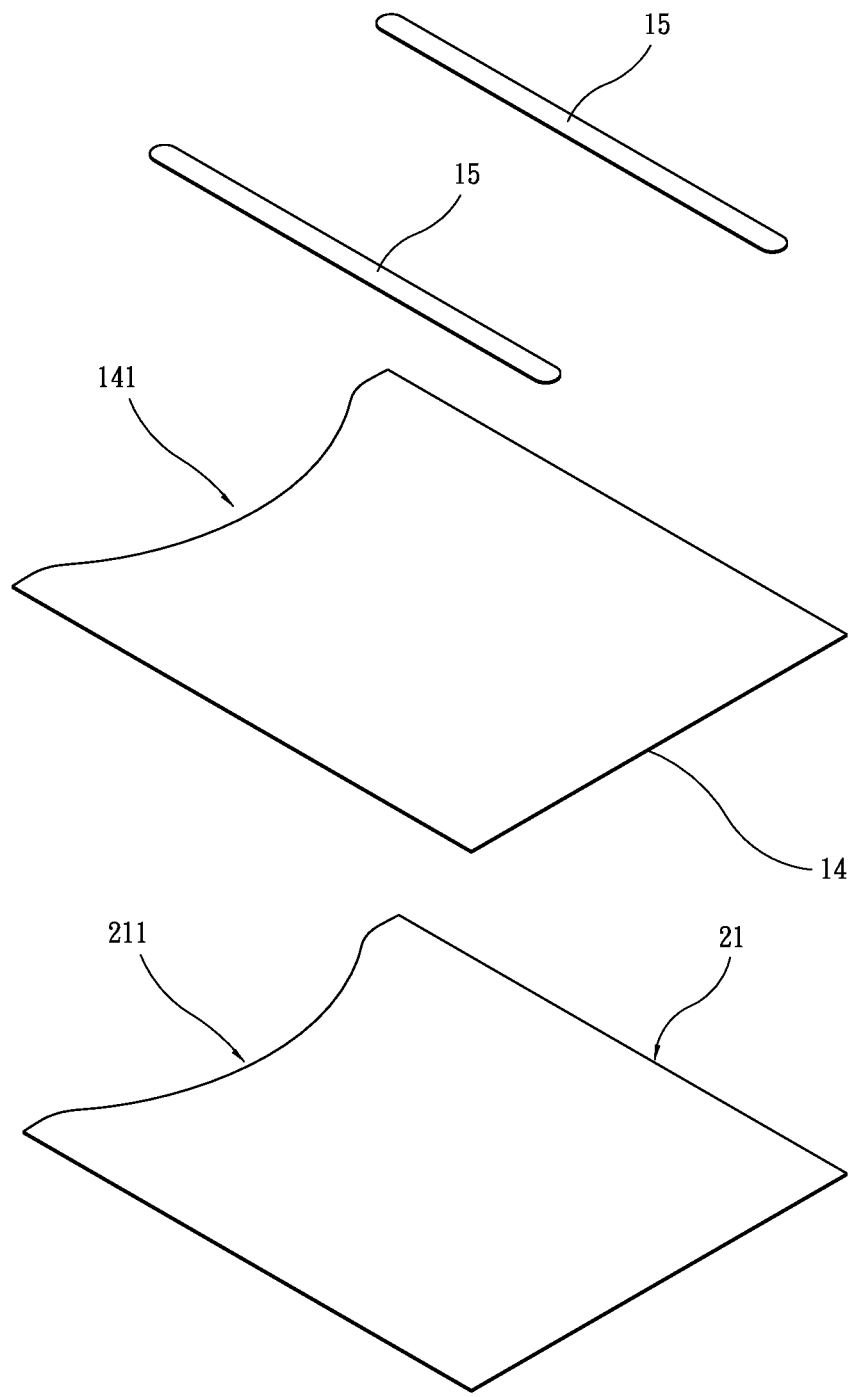
FIG. 4 is a schematic view showing parts, which jointly constitute a shaft section according to the preferred embodiment of the present invention, in a separated form.
Figure 5:
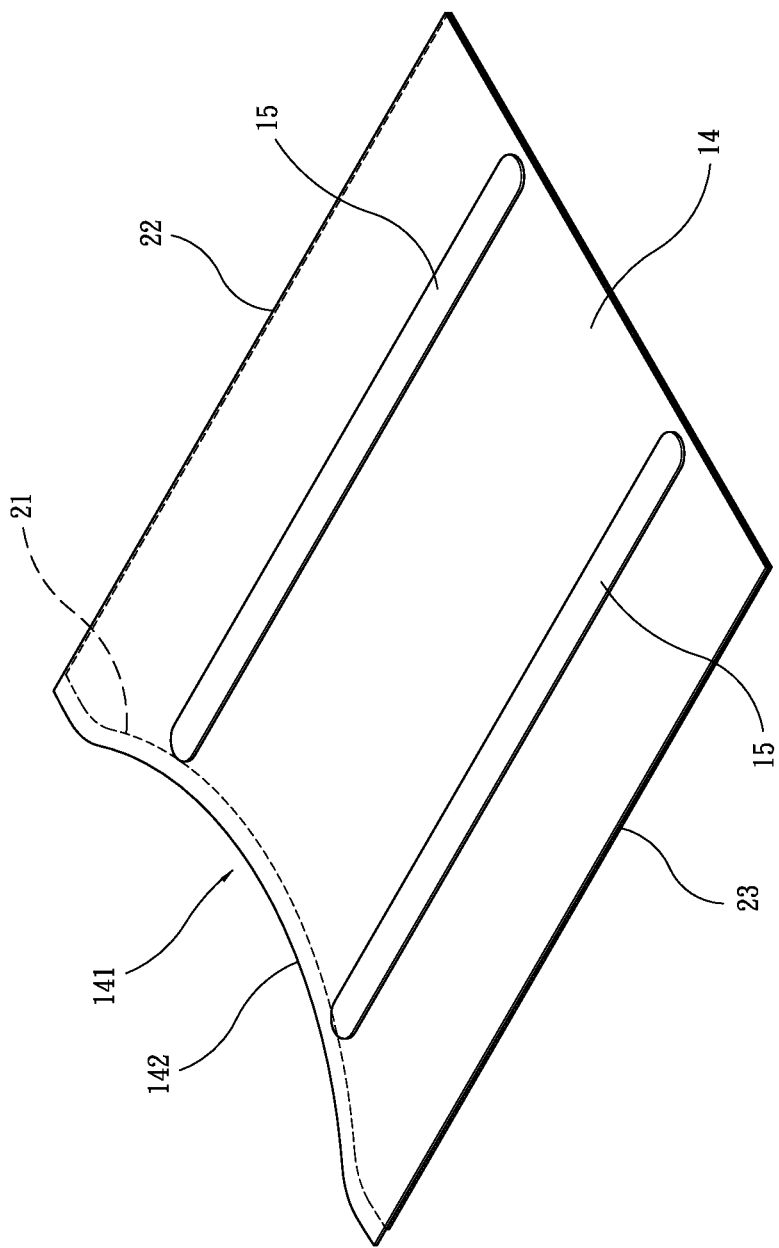
FIG. 5 is a schematic view illustrating the constituent parts of the shaft section that are stacked on each other according to the preferred embodiment before hot pressing.
Figure 6:
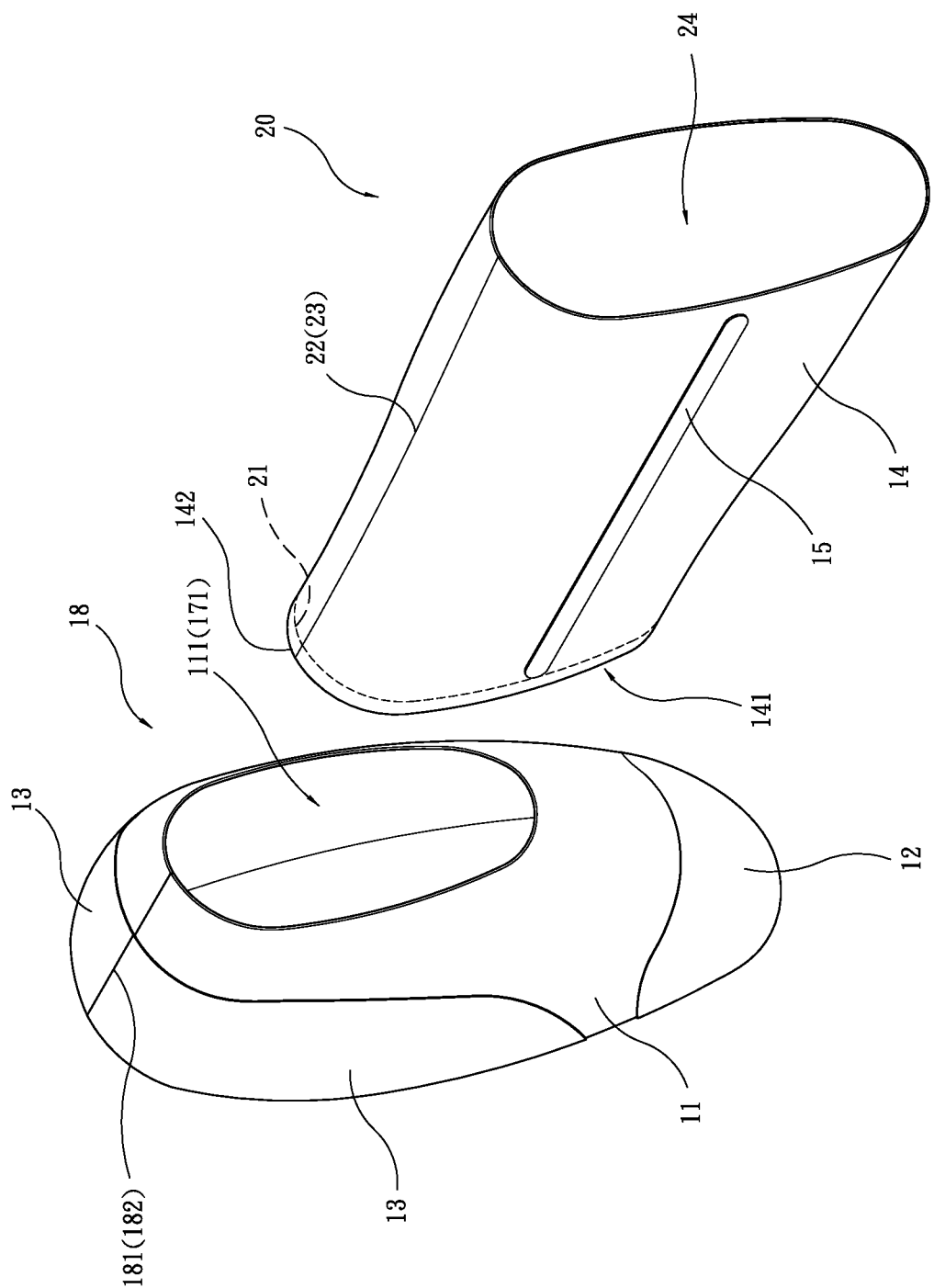
FIG. 6 is a schematic view illustrating the vamp section and the shaft section according to the preferred embodiment of the present invention in a separated form before combination with each other.
Figure 7:
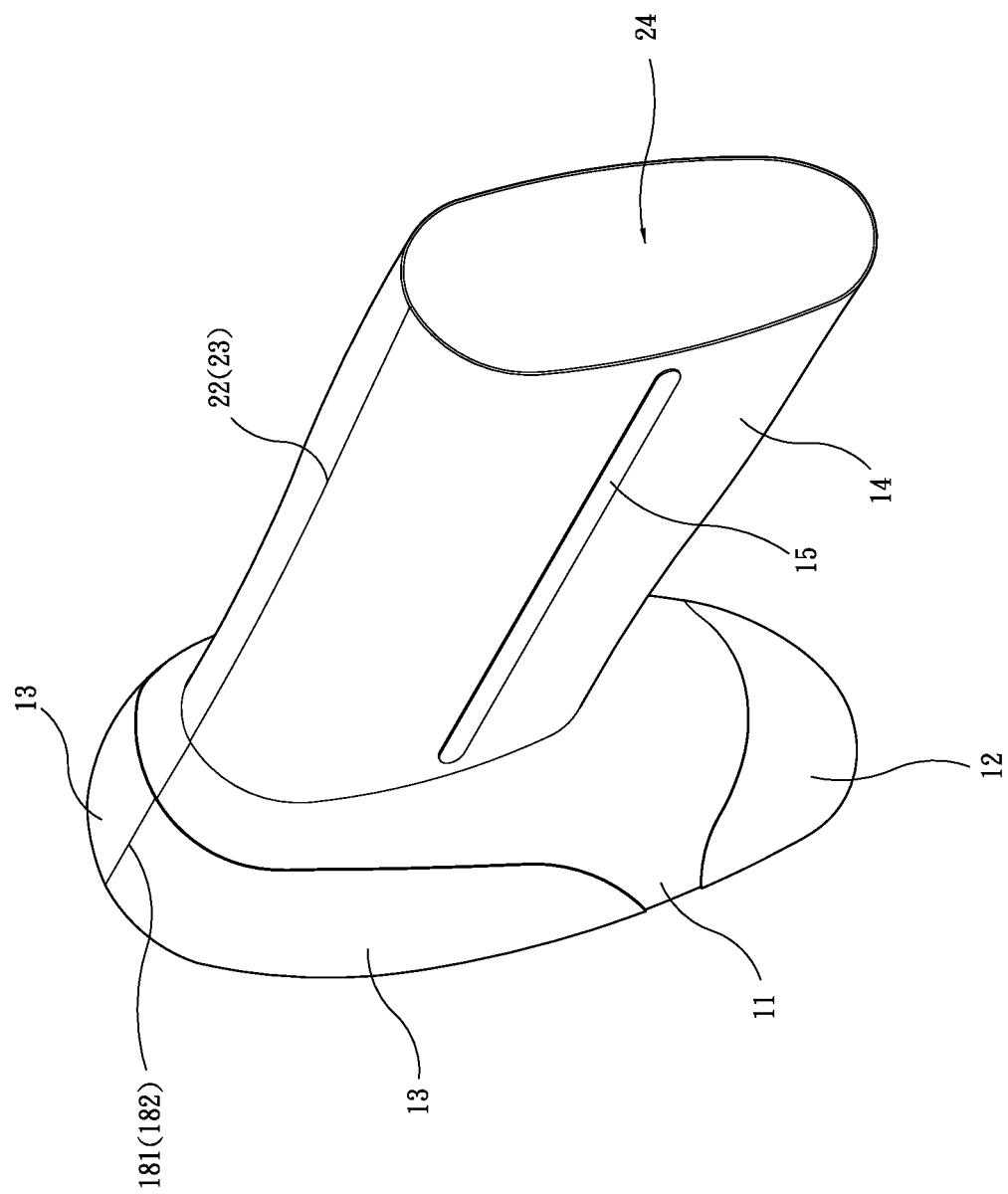
FIG. 7 is a schematic view illustrating the vamp section and the shaft section according to the preferred embodiment of the present invention after combination with each other.
Figure 8:
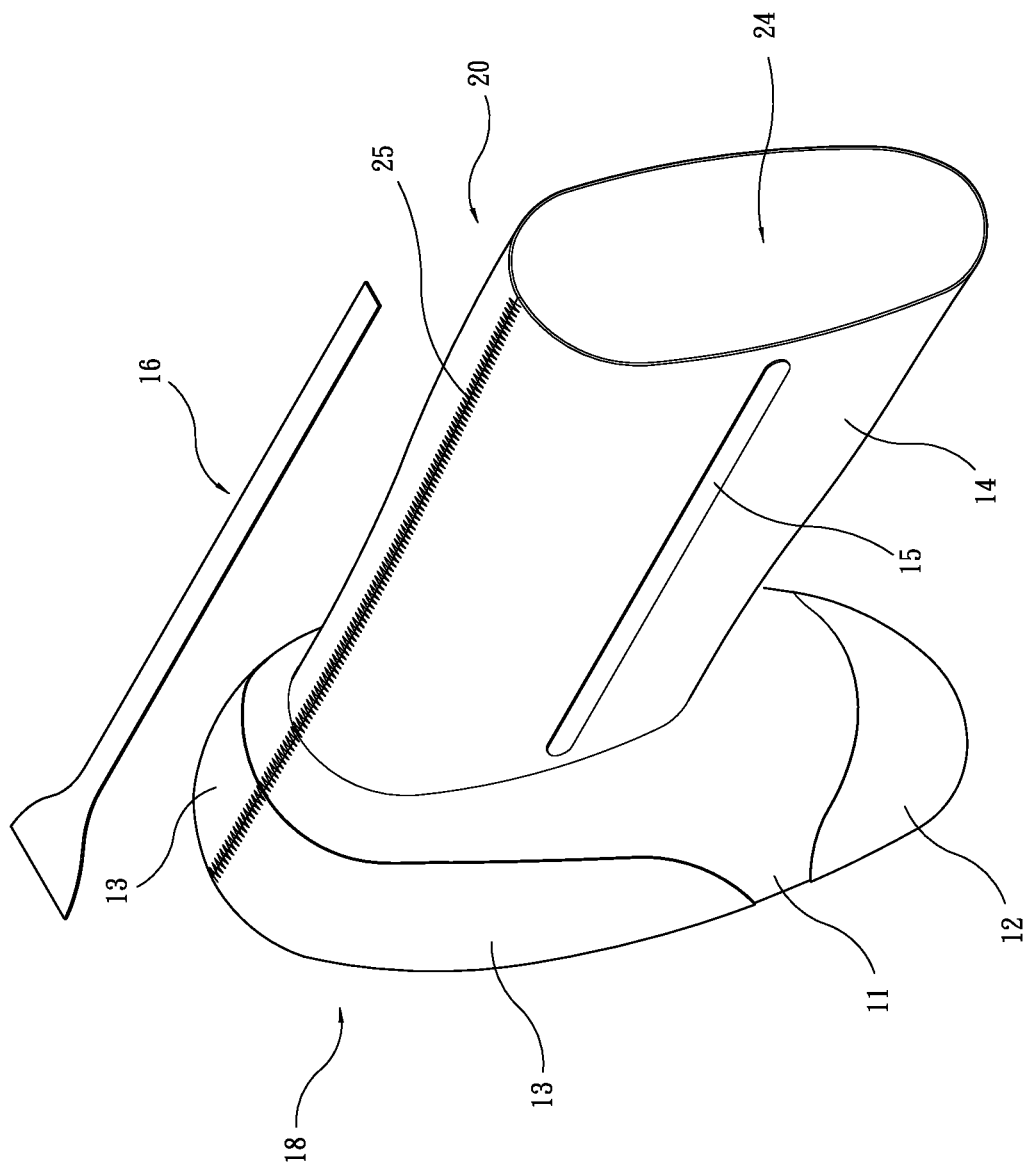
FIG. 8 is a schematic view illustrating the vamp section and the shaft section according to the preferred embodiment of the present invention in a condition after sewing applied to a rear side thereof and before attaching of a heel water-resistant plate thereto through hot pressing.
Figure 9:
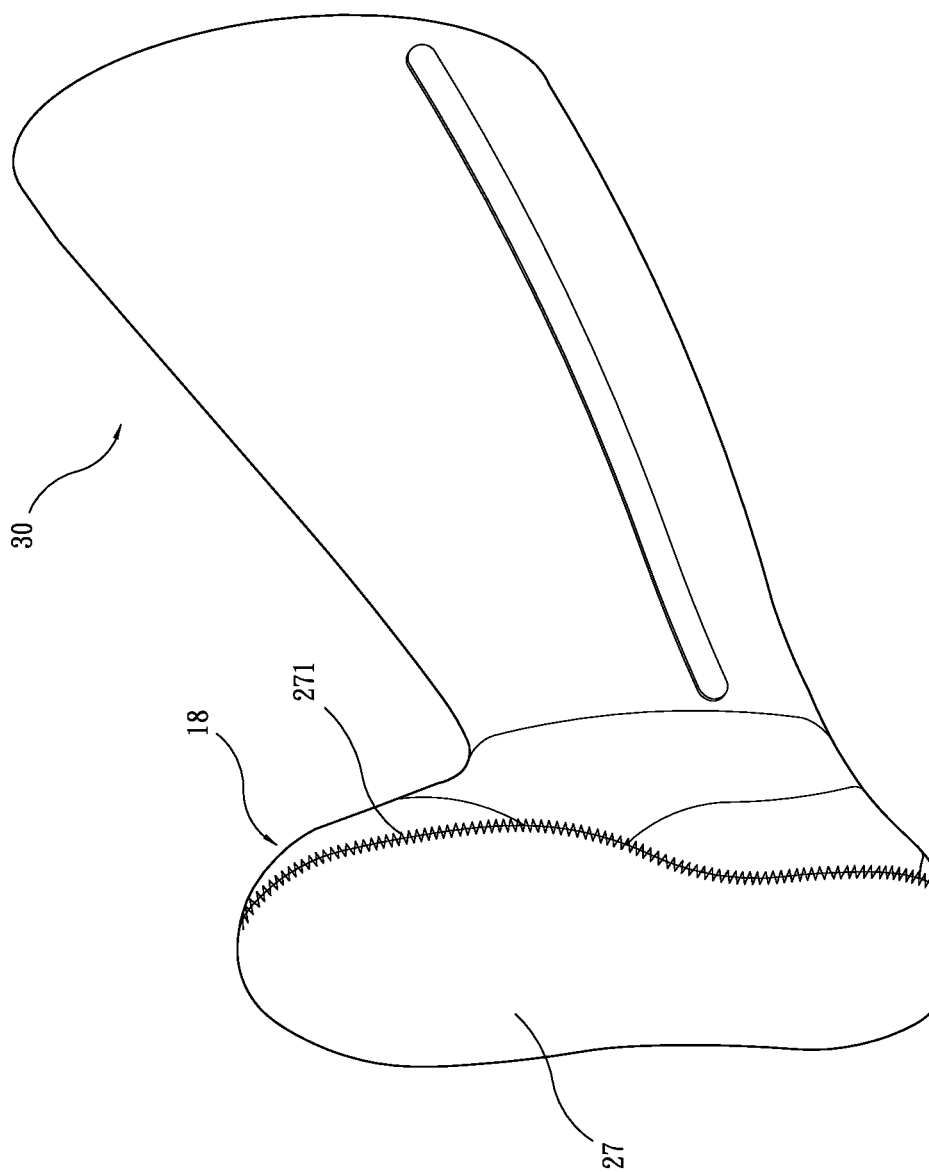
FIG. 9 is a schematic view illustrating a midsole according to the preferred embodiment of the present invention sewn to a bottom of the vamp section.

Referring first to FIGS. 1-19, the present invention provides, in an embodiment thereof, a method for manufacturing a waterproof boot, which comprises the following steps:

a first step of cutting, in which a piece of plastics-made waterproof leather 10 or rubber-made waterproof leather that has a back side coated with a water-resistant hot-melt adhesive is subjected to cutting and trimming to make a vamp water-resistant plate 11, a first vamp decorative plate 12, two second vamp decorative plates 13, a heel water-resistant plate 16, a shaft water-resistant plate 14, and two shaft decorative plates 15, wherein the vamp water-resistant plate 11 has one side edge that is notched or otherwise recessed inwardly to form a first insertion opening 111, and the shaft water-resistant plate 14 has one side edge that is formed with a shaft arc or curved opening 141; each of the vamp water-resistant plate 11, the first vamp decorative plate 12, the second vamp decorative plates 13, the heel water-resistant plate 16, the shaft water-resistant plate 14, and the shaft decorative plates 15 can be made, according to a desired design of an appearance or configuration of a waterproof boot, by selectively cutting from one or the same sheet of plastics-made waterproof leather or from different sheets of plastics-made waterproof leather; and the plastics-made waterproof leather 10 at least comprises one of thermoplastic polyurethane (TPU) and thermoplastic elastomer (TPE);

a second step of arranging pattern of vamp section 18 and shaft section 20, in which the vamp water-resistant plate 11 that is cut in the previous step is arranged on a vamp lining plate 17 that is in a planar form, wherein the vamp lining plate 17 has a side edge that is notched or otherwise recessed inwardly to form a second insertion opening 171, such that the second insertion opening 171 is in alignment with and overlaps the first insertion opening 111 of the vamp water-resistant plate 11, and meanwhile, the first vamp decorative plate 12 is arranged and stacked on the vamp lining plate 17 at one side of the vamp water-resistant plate 11 to be aligned with an outer contour of the vamp lining plate 17, and the two second vamp decorative plates 13 are respectively arranged and stacked on edge parts of two lateral sides of the second recessed opening 171 and are in alignment with the outer contour of the vamp lining plate 17, such that the vamp water-resistant plate 11, the first vamp decorative plate 12, the two second vamp decorative plates 13 jointly and completely cover the vamp lining plate; and further, the shaft water-resistant plate 14 that is cut in the previous step is arranged and stacked on a shaft lining plate 21, wherein the shaft lining plate 21 is formed with a lining arc or curved opening 211 on a side edge thereof corresponding to that of the shaft water-resistant plate 14 that is formed with the shaft arc opening 141, wherein the shaft water-resistant plate 14 is made longer than the shaft lining plate 21 such that the shaft arc opening 141 of the shaft water-resistant plate 14 projects beyond and is located outside the lining arc opening 211 of the shaft lining plate 21, namely a portion of shaft hot-melt adhesive 142 that is located along a peripheral edge of the shaft arc opening 141 is not covered by the shaft lining plate 21, and the two shaft decorative plates 15 are respectively arranged and stacked on two side portions of the shaft water-resistant plate 14;

a third step of hot pressing, in which the vamp lining plate 17 and the vamp water-resistant plate 11, the first vamp decorative plate 12, and the second vamp decorative plates 13 that are arranged and stacked thereon are placed in a hot pressing apparatus for hot pressing, such that the hot-melt adhesive layer on the back sides of the vamp water-resistant plate 11, the first vamp decorative plate 12, and the second vamp decorative plates 13 are heated and thus melted to combine with the vamp lining plate 17 as a unitary combination, and portions of the vamp water-resistant plate 11, the first vamp decorative plate 12, and the second vamp decorative plates 13 that are stacked on each other are also combined together as a unitary combination therebetween so as to form a water-resistant vamp section 18 (as shown in FIG. 3); further, the shaft lining plate 21 and the shaft water-resistant plate 14 and two shaft decorative plates 15 that are arranged and stacked thereon are also placed in the hot pressing apparatus for hot pressing, such that the hot-melt adhesive layer on the back sides of the shaft water-resistant plate 14 and the two shaft decorative plates 15 is heated and thus melted to combine with the shaft lining plate 21 and the shaft water-resistant plate 14 and the two shaft decorative plates 15 that are stacked on each other are also combined together to form a unitary combination therebetween so as to form a water-resistant shaft section 20 (as shown in FIG. 5);

a fourth step of combining vamp section 18 and shaft section 20 (as shown in FIGS. 6 and 7), in which a portion of the hot-melt adhesive that is located along a peripheral edge of the shaft arc opening 141 of the shaft section 20 is stacked on a peripheral edge of the first insertion opening 111 of the vamp water-resistant plate 11 of the vamp section 18 made in the previous steps and is subjected to hot pressing such that the portion of the shaft hot-melt adhesive 142 that is located along the peripheral edge of the shaft arc opening 141 of the shaft section 20 is heated and melted to combine the shaft section 20 and the vamp section 18 to each other;

a fifth step of sewing heel section (as shown in FIGS. 7 and 8), in which vamp outer edges 181, 182 of the vamp section 18 at two opposite sides of the first insertion opening 111 are jointed to each other and shaft outer edges 22, 23 of two opposite sides of the shaft section 20 are also jointed to each other, and they are sewn together so that the vamp section 18 and the shaft section 20 jointly form a three-dimensional configuration, wherein an opposite end of the shaft section 20 forms a shaft opening 24 that is connected to and in communication with the first insertion opening 111 of the vamp section 18; and portions around two sides of the sewn sites (a sewing line) of the vamp section 18 and the shaft section 20 form a heel section;

a sixth step of hot-pressing the heel section (as shown in FIG. 8), in which the heel water-resistant plate 16 that is made in the cutting operation of the first step is set on and covering the sewing line 25 of the vamp section 18 and the shaft section 20 and is subjected to hot pressing, so that the hot-melt adhesive on the back side of the heel water-resistant plate 16 is heated and melted and fuses and combines with the vamp section 18 and the shaft section 20 to form a unitary combination, and a joint site that is between the heel water-resistant plate 16 and the vamp section 18 and the shaft section 20 is made a waterproof interface therebetween;

a seventh step of combining midsole, in which a midsole 27 is attached to and combined with a bottom of the vamp section 18 by means of sewing designated at 271 to form a semi-finished product 30, wherein the midsole 27 may be alternatively combined with the vamp section 18 by means of adhesive; and an eighth step of injecting sole (as shown in FIGS. 10-16), in which the above-formed semi-finished product 30 is sleeved over or fit to a multi-segment last 50 of an injection apparatus 60; wherein the injection apparatus 60 comprises a first mold member 61 including a first mold cavity 63 and a second mold member 62 including a second mold cavity 64, which are respectively and pivotally mounted at two sides of a fixing pillar 65, such that the first mold member 61 and the second mold member 62 are movable relative to each other for closure to each other so as to enclose the semi-finished product 30 therebetween with only the midsole 27 and the sewing line 271 thereof exposed; the injection apparatus 60 further comprises a third mold member 66, and the third mold member 66 includes a third mold cavity 67, the third mold member being movable or otherwise operable to be closed onto the first mold member and the second mold member, with a sole gap 68 present between the third mold cavity and the midsole 27, such that a rubber material that is heated to be in a melted form is injected into the sole gap 68 and the melted rubber injected into the sole gap 68 combine with the midsole 27 to form a sole 31, wherein the sole 31 has an outer contour that has an upper rim 311 is attached to and combined with an outside surface of the vamp section to cover the sewing line 271 between the midsole 271 and the vamp section 18 (see FIG. 9) to provide an effect of waterproofness (see FIG. 17), and after cooling down, a product is formed and can be removed to provide a light-weight long-shaft waterproof boot 40, wherein the sole is made of a material that may comprises polyurethane (PU).

Figure 10:
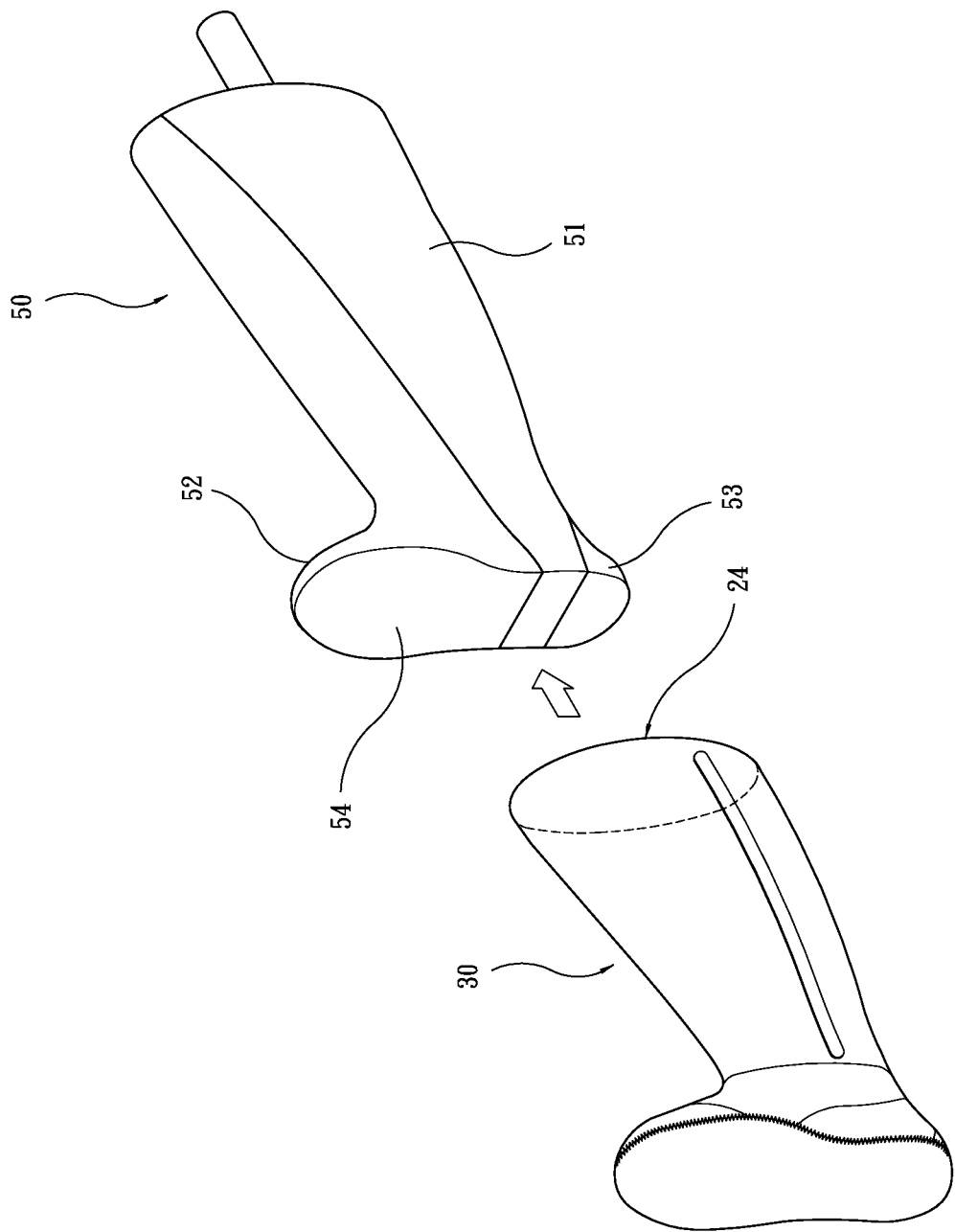
FIG. 10 is a schematic view illustrating a semi-finished product according to the preferred embodiment of the present invention before being fit to a multi-segment last.
Figure 11:
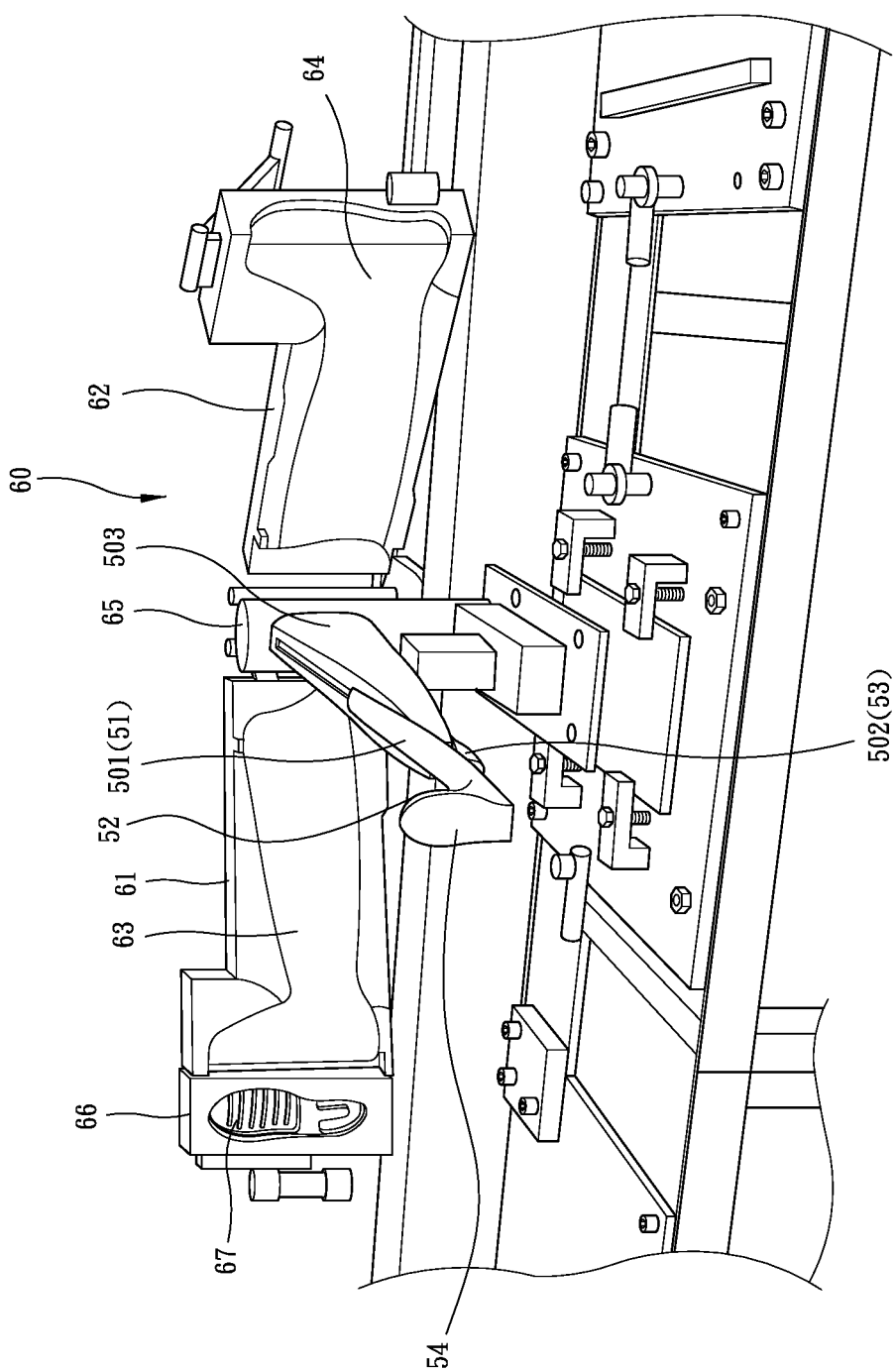
FIG. 11 is a schematic view illustrating the multi-segment last operable in combination with an injection apparatus according to the preferred embodiment of the present invention (in a condition that the multi-segment last is being moved).
Figure 12:
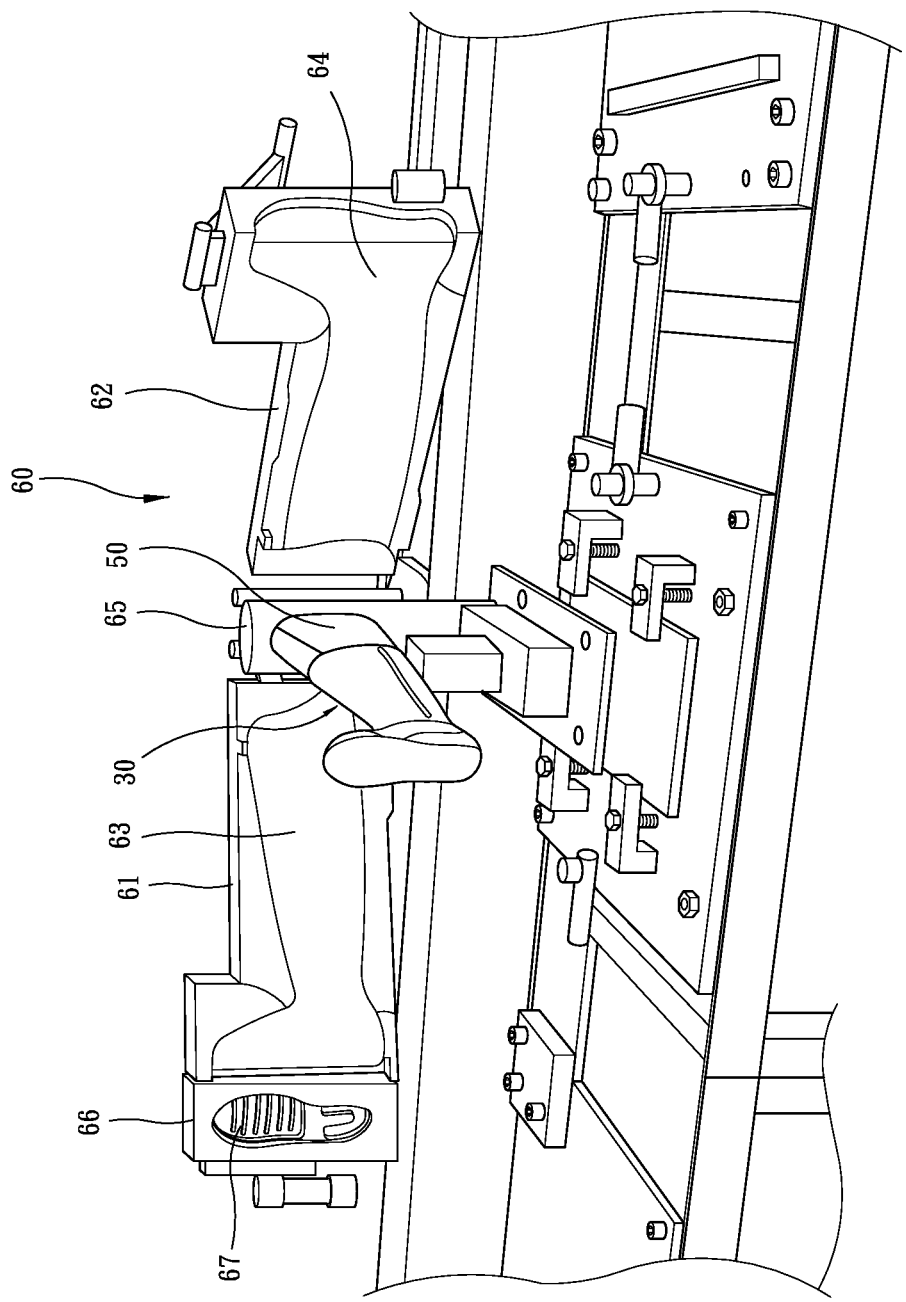
FIG. 12 is a schematic view illustrating the semi-finished product according to the preferred embodiment of the present invention fit to the multi-segment last.
Figure 13:
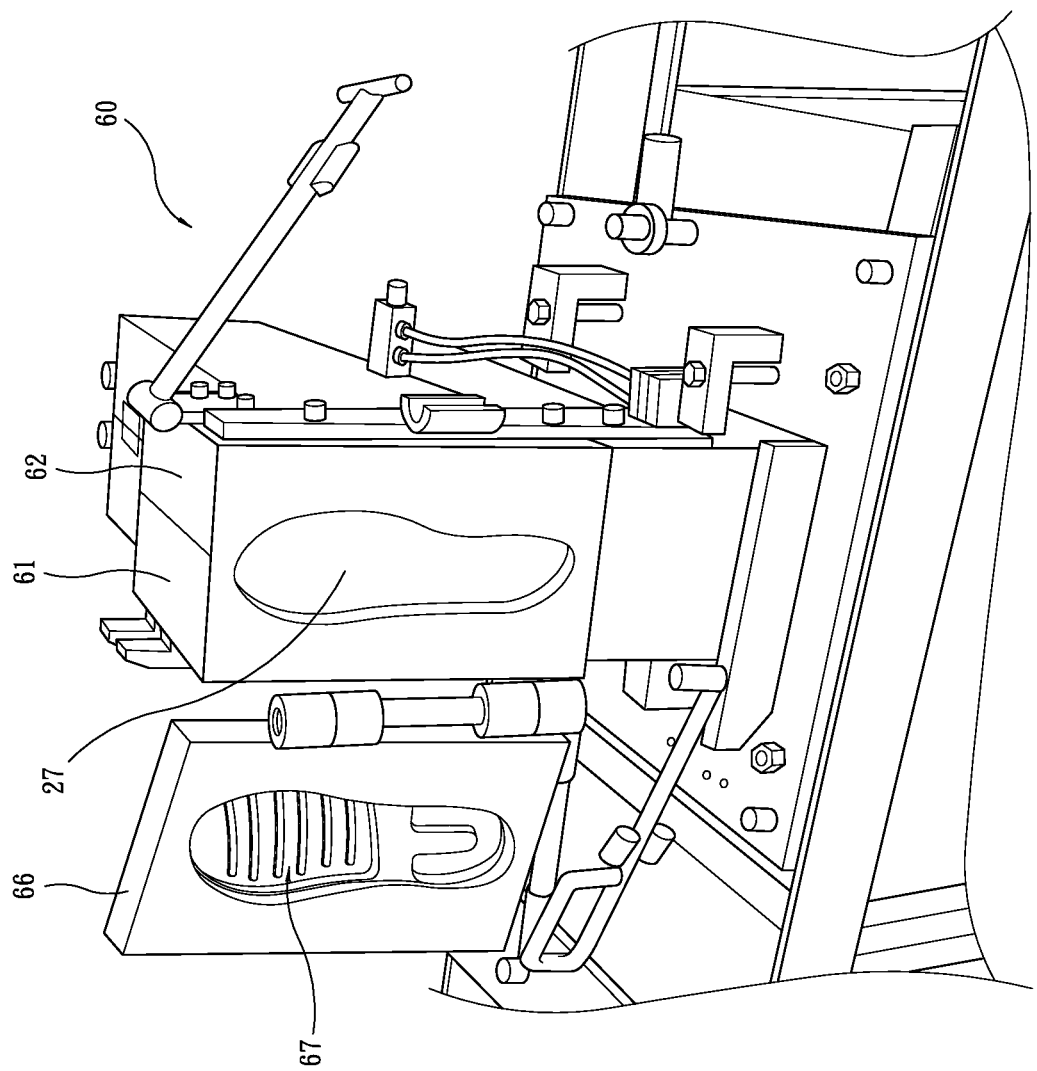
FIG. 13 is a schematic view illustrating a condition after a first mold member and a second mold member are closed and before a third mold member is closed according to the preferred embodiment of the present invention.
Figure 14:
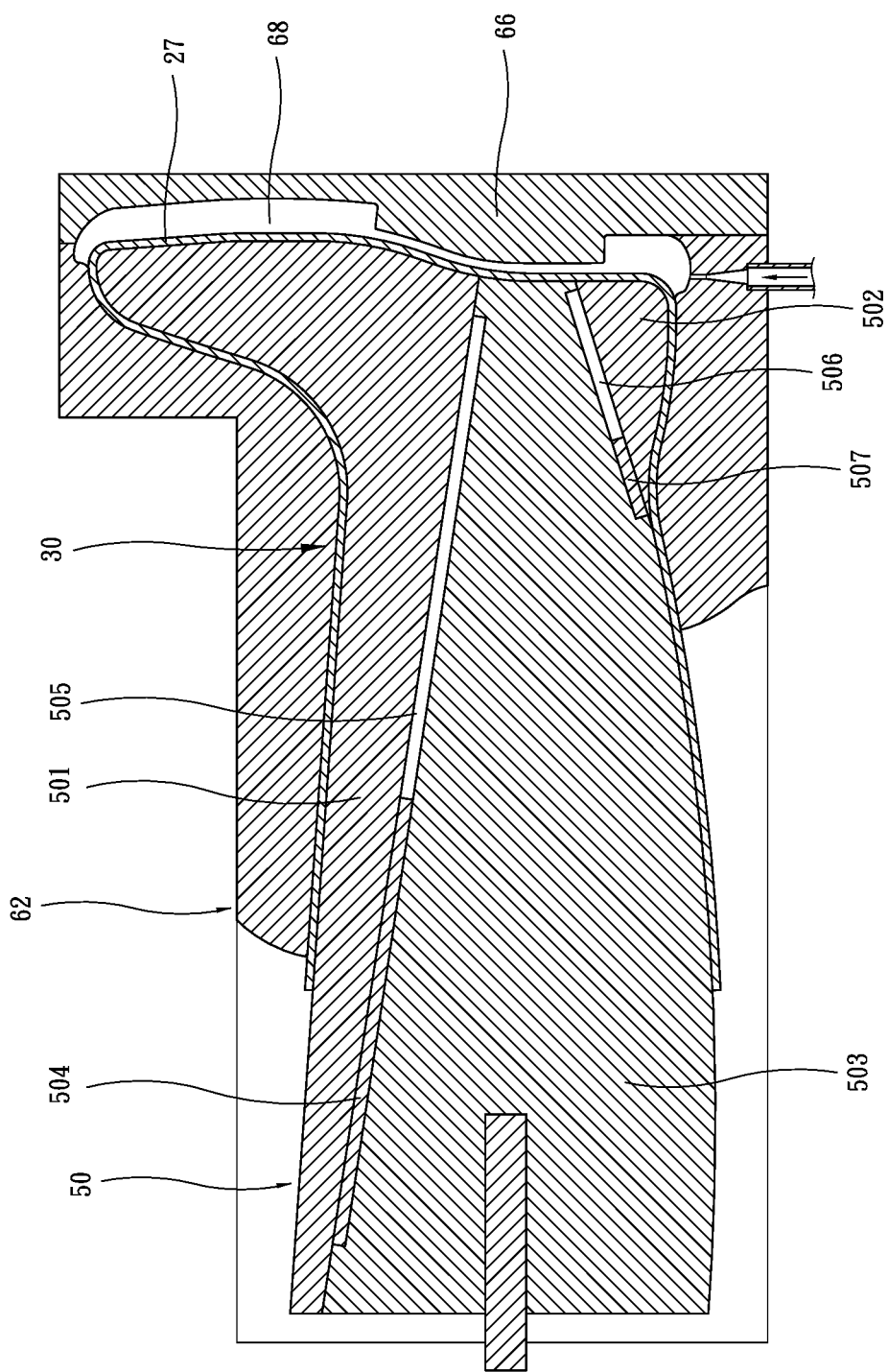
FIGS. 14 and 15 are schematic views, in sectioned forms, illustrating an operation of injection of a sole in a condition that the semi-finished product is placed in the mold.
Figure 15:
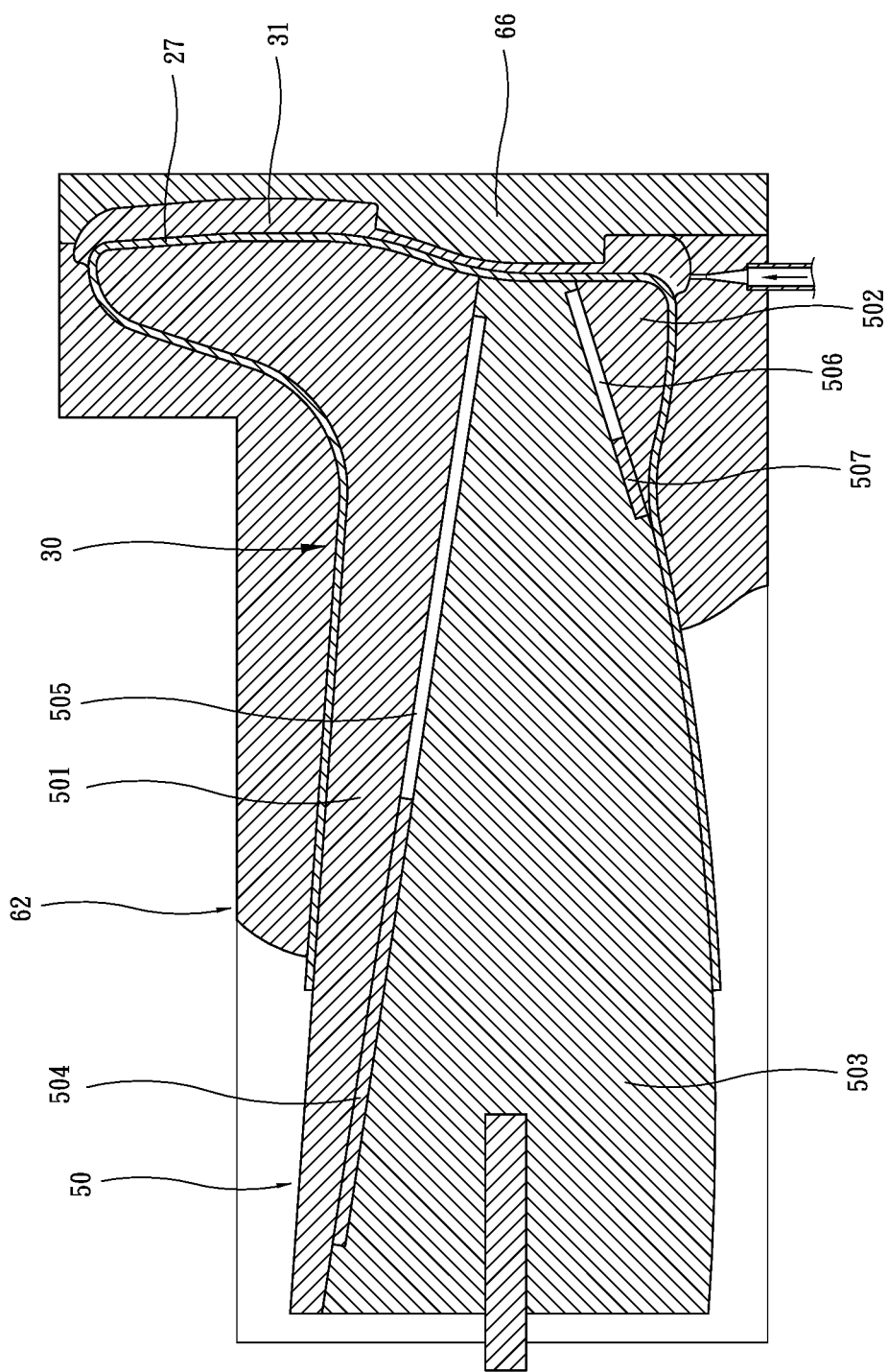
Figure 16:
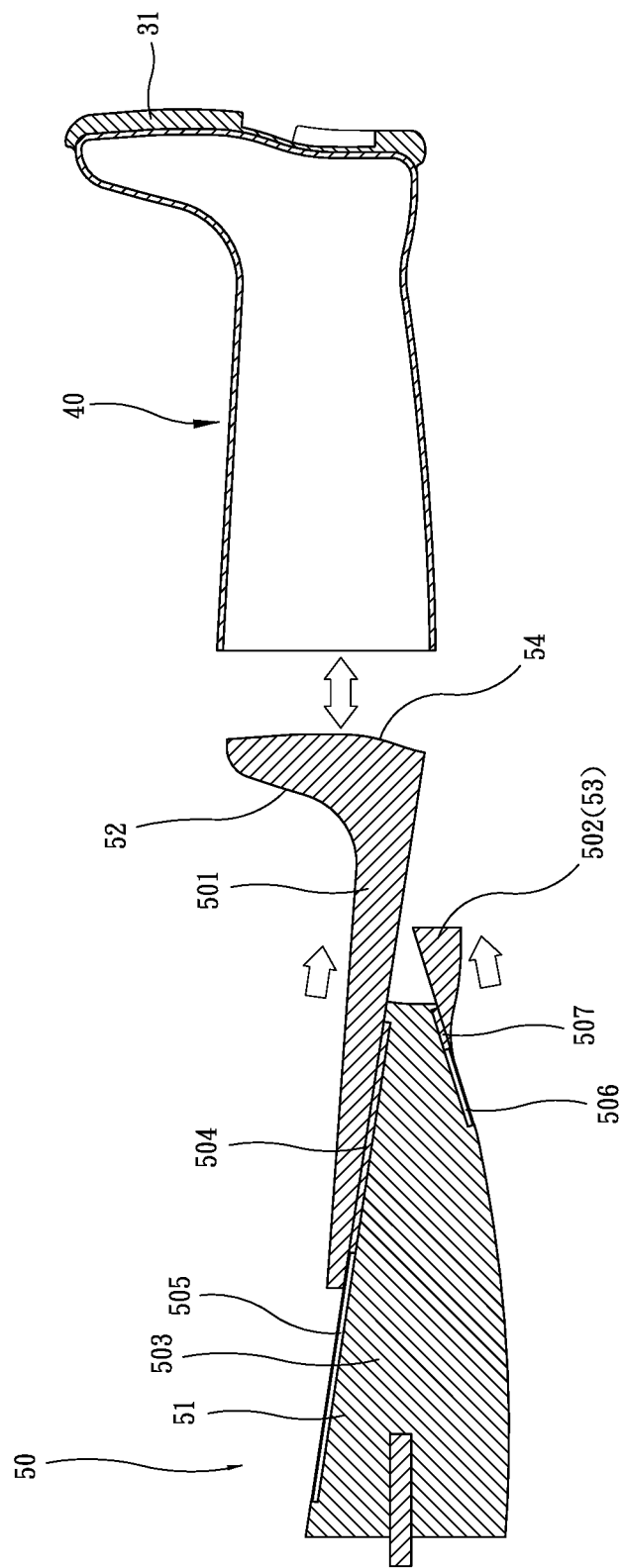
FIG. 16 is a schematic view, in a sectioned form, illustrating a product of waterproof boot manufactured with the preferred embodiment of the present invention being removed from the multi-segment last.
Figure 17:
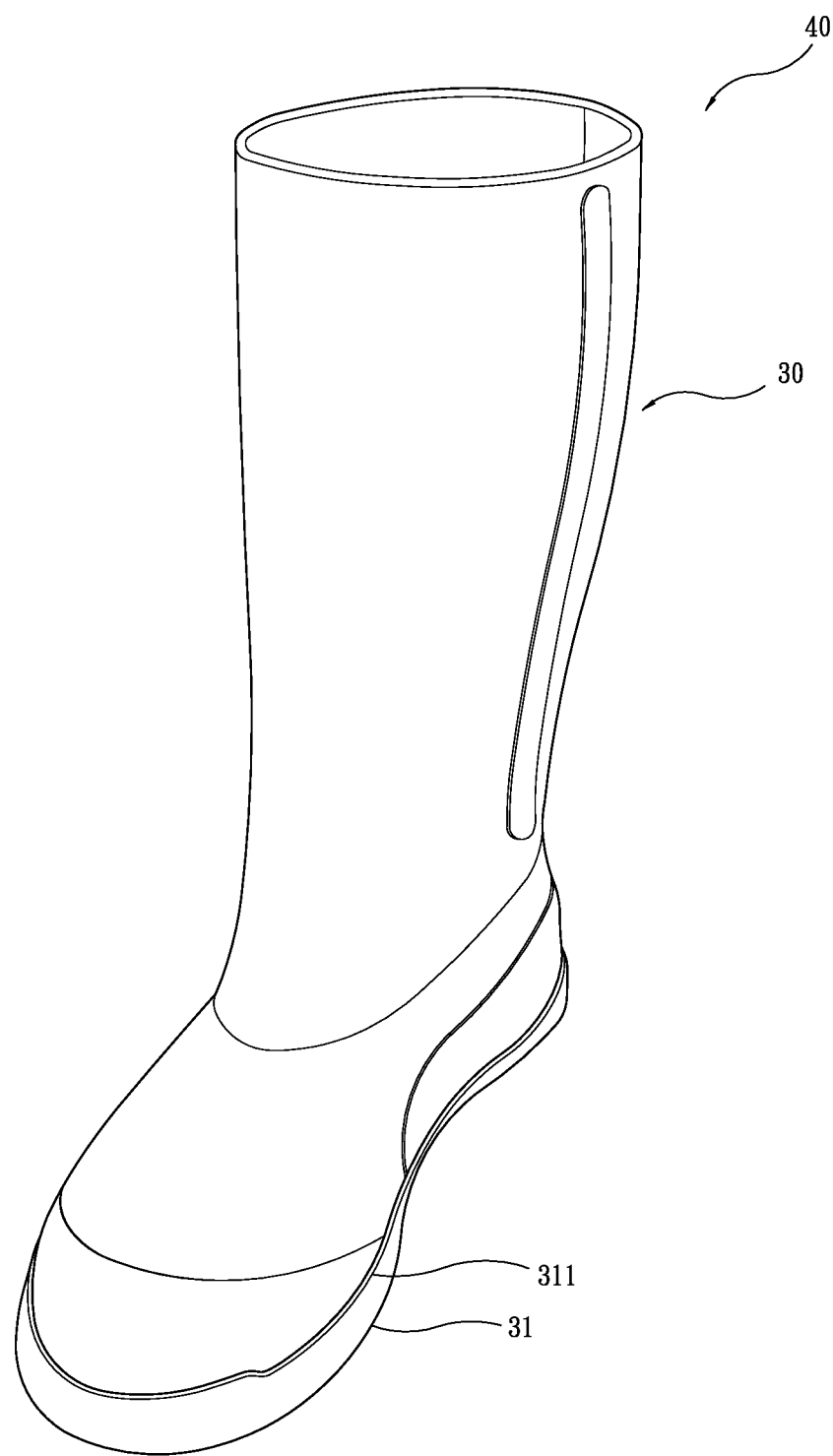
FIG. 17 is a perspective view showing a waterproof boot manufactured with the preferred embodiment of the present invention.

Referring to FIGS. 10 and 16, it is particularly noted here that the multi-segment last 50 is structured as made up of various parts, including a shaft section 51, a vamp section 52, a heel section 53, and a sole section 54, and in addition, the multi-segment last 50 can be separated into three separate, individual portions, including a first slidable section 501, a second slidable section 502, and a non-slidable section 503. The non-slidable section 503 is fixed and securely mounted to a fixing pillar 65 of the injection apparatus 60. The first slidable section 501 is the part that forms a part of the vamp section 52 and a part of the shaft section 51 of the last 50. The first slidable section 501 and the non-slidable section 503 have contact surfaces that are in surface engagement with each other and are inclined and are provided with a slide rack 504 and a slide channel 505 that are in mating engagement with each other arranged therebetween, so that the first slidable section 501 is reciprocally movable or slidable on and relative to the non-slidable section 503, wherein the slide rack 504 and the slide channel 505 provided between the two sections are arranged to incline downward in a direction from the shaft section 51 toward the sole section 54, so that when the first slidable section 501 moves in a direction toward the sole section 54, the first slidable section 501 gradually reduces a vertical position, namely height, thereof relative to a horizon to get approaching to the second slidable section 502. The second slidable section 502 is the part that forms the heel section 53 of the last 50. The second slidable section 502 and the non-slidable section 503 have contact surfaces that are in surface engagement with each other and are inclined and are provided with a slide rack 507 and a slide channel 506 that are in mating engagement with each other arranged therebetween, so that the second slidable section 502 is reciprocally movable or slidable on and relative the non-slidable section 503, wherein the slide rack 507 and the slide channel 506 provided between the two sections are arranged to incline upward in a direction from the shaft section 51 toward the sole section 54, so that when the second slidable section 502 moves in a direction toward the sole section 54, the second slidable section 502 gradually raises a vertical position, namely height, thereof relative to a horizon to get approaching to the first slidable section 501. As such, the product of waterproof boot 40 so manufactured can be readily removed from the multi-segment last 50. Oppositely, as shown in FIG. 10, to fit a semi-finished product 30 to the multi-segment last 50, an similar operation is conducted, but in an opposite sequence, to readily fit the semi-finished product 30 to the multi-segment last 50.

The above description indicates that the present invention possesses the following advantages:

(1) The present invention uses cured rubber-made waterproof leather or thermoplastic polyurethane (TPU) or thermoplastic elastomer (TPE) as a material to make the vamp section, and during the process of manufacturing, such materials do not require an operation of vulcanization to be applied thereto. As such, the present invention could great improve the efficiency of manufacturing waterproof boots or footwears.

(2) The present invention uses a hot-pressing operation to carry out fabrication of the vamp section 18 and the shaft section 20, so that the vamp section 18 and the shaft section 20 completely require no operation of sewing or stitching and as a whole, complication of a sewing operation applied in manufacturing waterproof boots or footwears can be completely omitted to thereby greatly improve conventional shoe/boot manufacturing processes that involve additional operations of sewing or stitching. This, again, helps improve the efficiency of manufacturing waterproof boots or footwears greatly.

(3) The present invention accomplishes fabrication of the vamp section 18 and the shaft section 20 by subjecting a sheet of waterproof leather material that is coated with waterproof hot-melt adhesive to hot pressing, and the sewing line of the heel section can be covered by the heel plate 16 through hot pressing to provide an effect of water resistance, and in addition, the sewing line 271 between the midsole 27 and the vamp section 18 can be covered by the upper rim 311 of the outer contour of the sole 31 to provide an effect of water resistance. As such, the present invention may be applied to make a waterproof boot or footwear that exhibits an excellent effect of waterproofness.

(4) The present invention accomplishes fabrication of the vamp section 18 and the shaft section 20 by subjecting a sheet of waterproof leather material, which is light and thin, to hot pressing, so that comparison of the present invention to a waterproof footwear manufactured with the method disclosed in the previously cited Chinese Patent No. 201610019912.2 would show that a long-shaft waterproof boot 40 or a shaft-less waterproof footwear 41 manufactured with the method the present invention could greatly reduce the weigh thereof.

Figure 18:
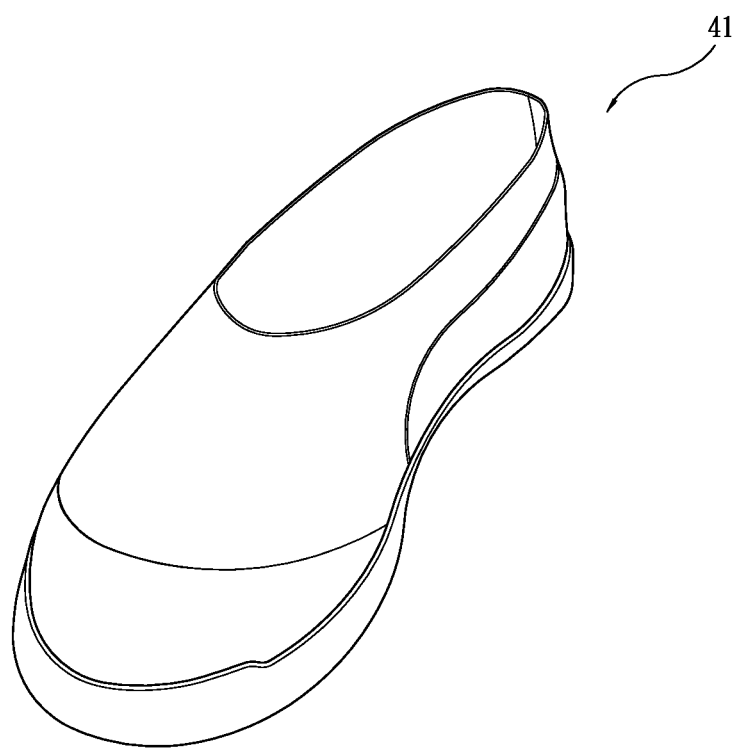
FIG. 18 is a perspective view showing a shaft-lee waterproof shoe manufactured with a preferred embodiment of the present invention.
Figure 19:
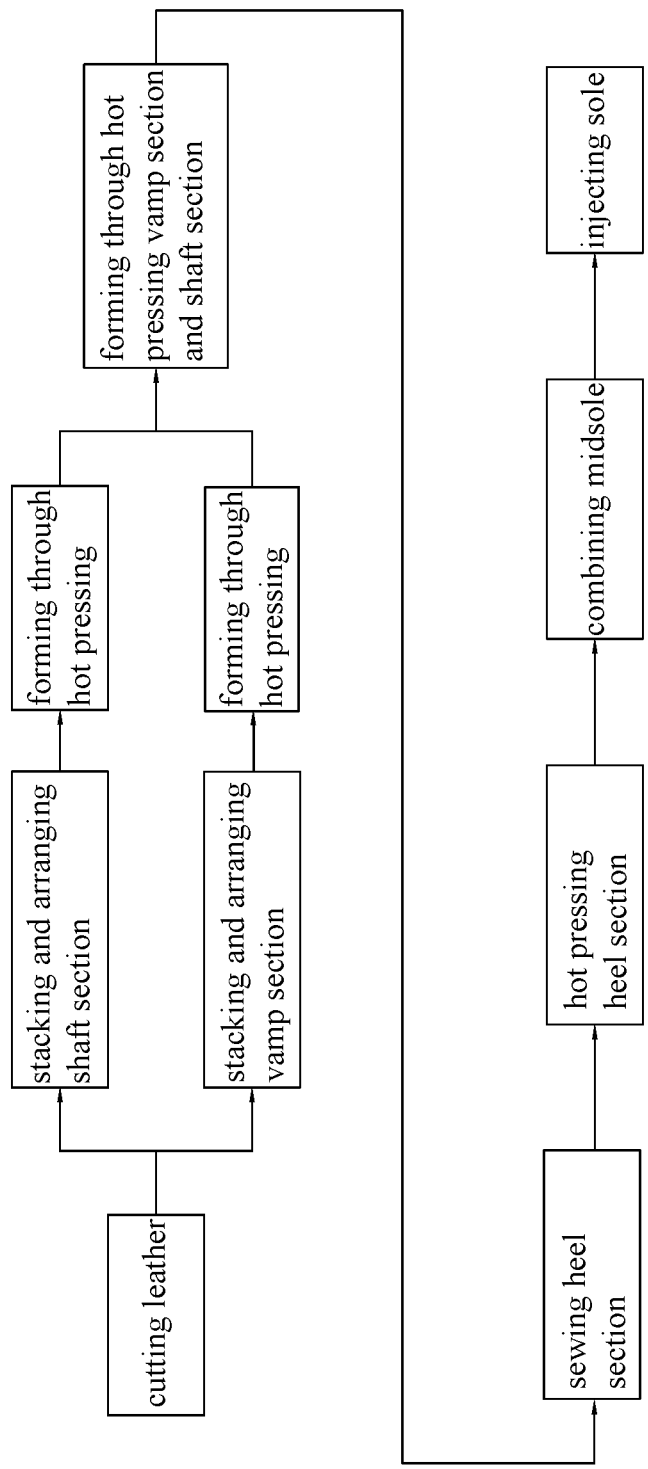
FIG. 19 is a flow chart illustrating a process of manufacturing a waterproof boot according to the preferred embodiment of the present invention.
Figure 20:
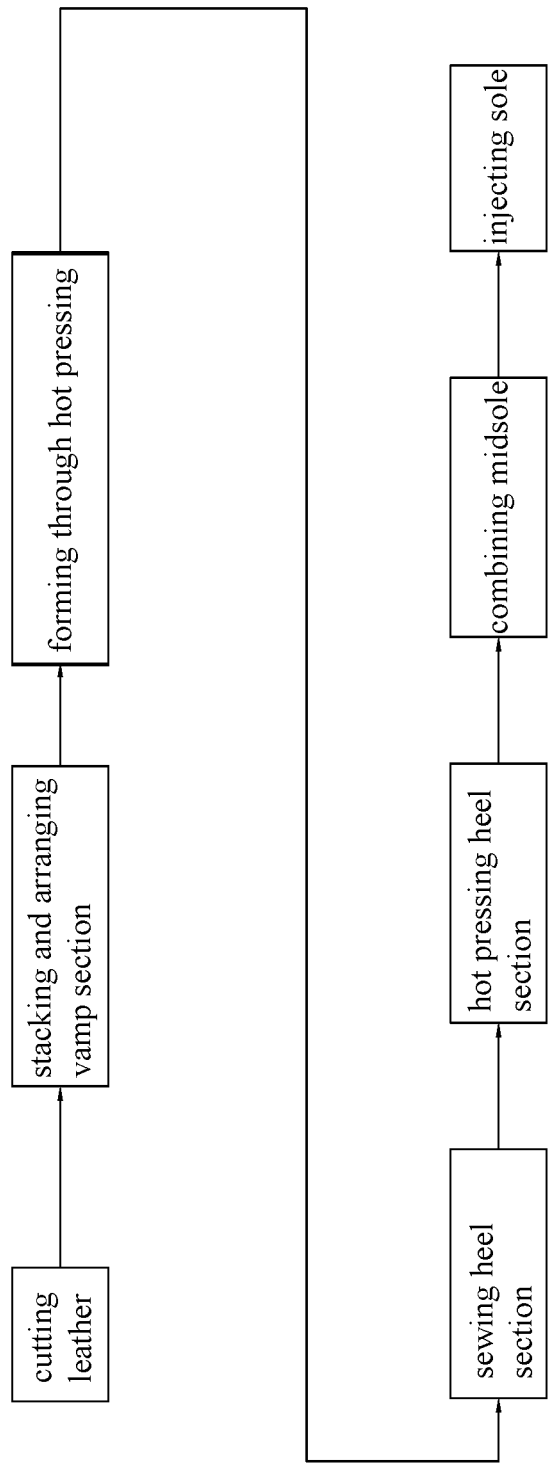
FIG. 20 is a flow chart illustrating a process of manufacturing a shaft-less waterproof shoe according to the preferred embodiment of the present invention.
Figure 21:
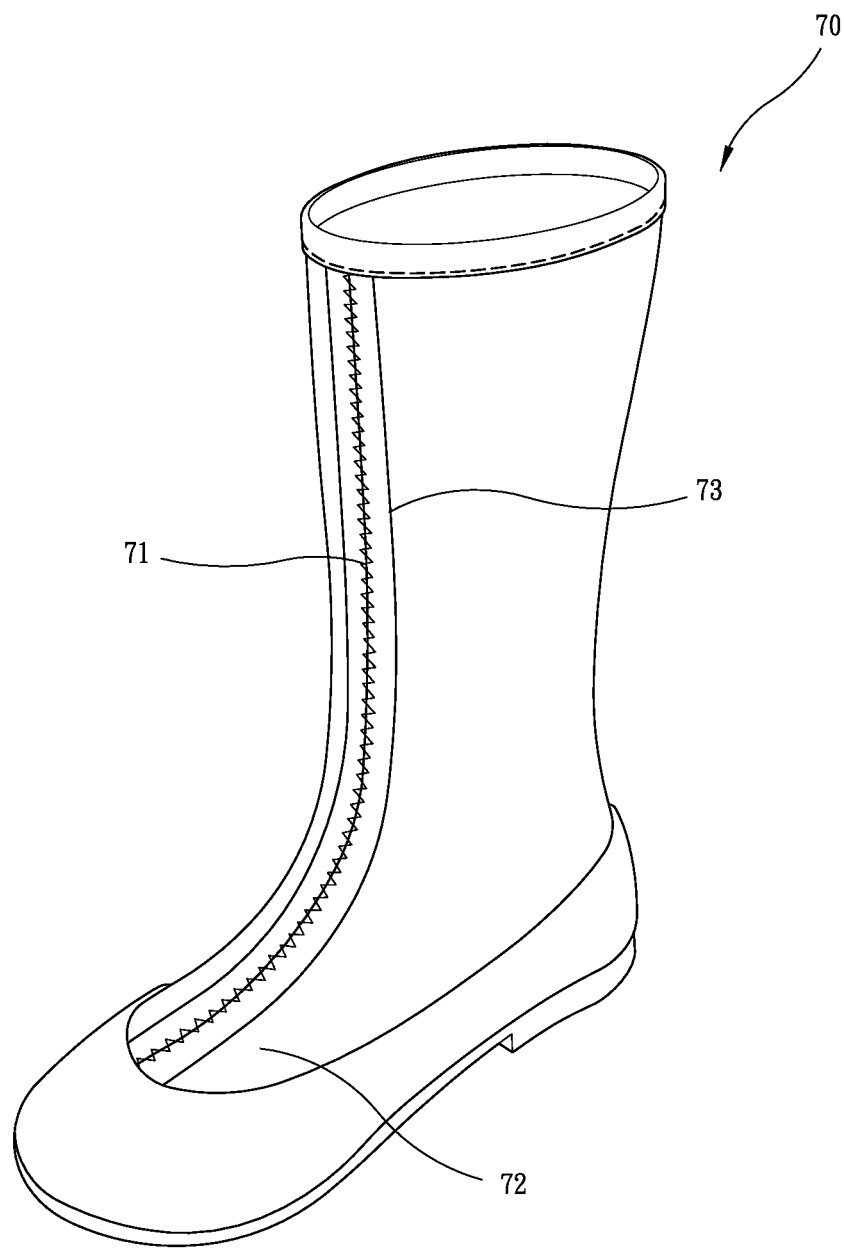
FIG. 21 is a perspective view showing a conventional rubber boot.

Referring to FIGS. 18 and 20, which illustrate a process according to the present invention that is applicable to manufacturing of a shaft-less waterproof footwear or shoe 41, such a process is different from the method or process of the present invention that is used to make a waterproof boot 40 in that operations concerning fabrication of the shaft section 20 and combination of the shaft section 20 and the vamp section 18 are omitted, while the remaining operations and flow are exactly the same as those for the waterproof boot 40. Therefore, repeated description will be omitted herein, but one can refer to what described above to manufacture a light-weight shaft-less waterproof shoe.

In summary, the present invention, as described above, demonstrate significant utilization and improvement, and to the best Applicant understands, no similar or identical invention has been proposed or filed for patent either domestically or aboard. The invention as descried above is believed novel and inventive.

I claim:

1. A method for manufacturing a light-weight waterproof shoe, at least comprising the following steps:
    a first step of cutting, in which a piece of waterproof leather that has a back side coated with a water-resistant hot-melt adhesive is subjected to a cutting operation to make at least a vamp water-resistant plate, one to multiple vamp decorative plates, and a heel water-resistant plate, wherein the vamp water-resistant plate has one side edge that is recessed inwardly to form a first insertion opening;
    a second step of arranging pattern of vamp section, in which the vamp water-resistant plate and the one to multiple vamp decorative plates that are formed with the cutting operation in the previous step are arranged and stacked on a vamp lining plate that is in a planar form, wherein the vamp lining plate has a side edge that is recessed inwardly to form a second insertion opening, such that the second insertion opening is in alignment with and overlaps the first insertion opening of the vamp water-resistant plate;
    a third step of hot pressing, in which the vamp lining plate and the vamp water-resistant plate and the vamp decorative plates that are arranged and stacked thereon are placed in a hot pressing apparatus for hot pressing, such that the hot-melt adhesive layer on the back sides of the vamp water-resistant plate and the vamp decorative plates are heated and melted to combine with the vamp lining plate as a unitary combination, and portions of the vamp water-resistant plate and the vamp decorative plates that are stacked on each other are combined together as a unitary combination so as to form a water-resistant vamp section;
    a fourth step of sewing heel section, in which vamp outer edges of the vamp section at two opposite sides of the first insertion opening are jointed to each other and are fixed together through sewing so as to make the vamp section in a three-dimensional configuration;

a fifth step of hot-pressing heel section, in which the heel water-resistant plate that is made in the cutting operation of the first step is set on and covering the sewing line of the vamp section and is subjected to hot pressing, so that the hot-melt adhesive on the back side of the heel water-resistant plate is heated and melted and combines with the vamp section to form a unitary combination, and a joint site that is between the heel water-resistant plate and the vamp section is made a waterproof interface therebetween;

a sixth step of combining midsole, in which a midsole is attached to and combined with a bottom of the vamp section by means of sewing or adhesive to form a semi-finished product; and a seventh step of injecting sole, in which the semi-finished product is fit to a multi-segment last of an injection apparatus and a first mold member, a second mold member, and a third mold member are closed to enclose the semi-finished product, such that after the third mold member is closed, a sole gap is formed between a third mold cavity of the third mold member and the midsole of the semi-finished product; and a sole material that is heated and melted is injected into the third mold cavity of the third mold member to form a sole, wherein the sole material that is injected into the third mold cavity combines with the midsole and covers a joint interface between the midsole and the vamp section so that after being cooled, a product is formed and removed to form a light-weight waterproof shoe.

2. The method for manufacturing a light-weight waterproof shoe according to claim 1, wherein the waterproof leather comprises rubber-made waterproof leather.

3. The method for manufacturing a light-weight waterproof shoe according to claim 1, wherein the waterproof leather comprises plastics-made waterproof leather.

4. The method for manufacturing a light-weight waterproof shoe according to claim 1, wherein the sole material comprises rubber.

5. The method for manufacturing a light-weight waterproof shoe according to claim 1, wherein the sole material comprises polyurethane (PU).

6. The method for manufacturing a light-weight waterproof shoe according to claim 3, wherein the plastics-made waterproof leather comprises thermoplastic polyurethane (TPU).

7. The method for manufacturing a light-weight waterproof shoe according to claim 3, wherein the plastics-made waterproof leather comprises thermoplastic elastomer (TPE).

8. A method for manufacturing a light-weight waterproof boot, at least comprising the following steps:

a first step of cutting, in which a piece of waterproof leather that has a back side coated with a water-resistant hot-melt adhesive is subjected to a cutting operation to make at least a vamp water-resistant plate, one to multiple vamp decorative plates, a heel water-resistant plate, and a shaft water-resistant plate, wherein the vamp water-resistant plate has one side edge that is recessed inwardly to form a first insertion opening and the shaft water-resistant plate has one side edge that is formed with a shaft arc opening;

a second step of arranging pattern of vamp section and the shaft section, in which the vamp water-resistant plate and the one to multiple vamp decorative plates that are formed with the cutting operation in the previous step are arranged and stacked on a vamp lining plate that is in a planar form, and the shaft water-resistant plate that is formed with the cutting operation in the previous step is arranged and stacked on a shaft lining plate, wherein the vamp lining plate has a side edge that is recessed inwardly to form a second insertion opening, such that the second insertion opening is in alignment with and overlaps the first insertion opening of the vamp water-resistant plate; and the shaft lining plate is formed with a lining arc opening on a side edge thereof corresponding to that of the shaft water-resistant plate that is formed with the shaft arc opening, wherein the shaft water-resistant plate is longer than the shaft lining plate such that the shaft arc opening of the shaft water-resistant plate projects beyond and is located outside the lining arc opening of the shaft lining plate, and a portion of shaft hot-melt adhesive that is located along a peripheral edge of the shaft arc opening is not covered by the shaft lining plate;

a third step of hot pressing, in which the vamp lining plate and the vamp water-resistant plate, and the vamp decorative plates that are arranged and stacked thereon are placed in a hot pressing apparatus for hot pressing, such that the hot-melt adhesive layer on the back sides of the vamp water-resistant plate and the vamp decorative plates are heated and melted to combine with the vamp lining plate as a unitary combination, and portions of the vamp water-resistant plate and the vamp decorative plates that are stacked on each other are combined together as a unitary combination so as to form a water-resistant vamp section; and the shaft lining plate and the shaft water-resistant plate arranged and stacked thereon are placed in the hot pressing apparatus for hot pressing, such that the hot-melt adhesive layer on the back side of the shaft water-resistant plate is heated and melted to combine with the shaft lining plate as a unitary combination to form a water-resistant shaft section;

a fourth step of combining vamp section and shaft section, in which a portion of the hot-melt adhesive that is located along a peripheral edge of the shaft arc opening of the shaft section is stacked on a peripheral edge of the first insertion opening of the vamp water-resistant plate of the vamp section formed in the previous steps and is subjected to hot pressing such that the portion of the shaft hot-melt adhesive that is located along the peripheral edge of the shaft arc opening of the shaft section is heated and melted to combine the shaft section and the vamp section to each other;

a fifth step of sewing heel section, in which vamp outer edges of the vamp section at two opposite sides of the first insertion opening are jointed to each other and shaft outer edges of two opposite sides of the shaft section are jointed to each other, and are sewn together so that the vamp section and the shaft section jointly form a three-dimensional configuration, wherein an opposite end of the shaft section forms a shaft opening that is connected to and in communication with the first insertion opening of the vamp section; and portions around two sides of the sewn sites of the vamp section and the shaft section form a heel section;

a sixth step of hot-pressing heel section, in which the heel water-resistant plate that is made in the cutting operation of the first step is set on and covering the sewing line of the vamp section and the shaft section and is subjected to hot pressing, so that the hot-melt adhesive on the back side of the heel water-resistant plate is heated and melted and combines with the vamp section and the shaft section to form a unitary combination, and a joint site that is between the heel water-resistant plate and the vamp section and the shaft section is made a waterproof interface therebetween;

a seventh step of combining midsole, in which a midsole is attached to and combined with a bottom of the vamp section by means of sewing or adhesive to form a semi-finished product; and an eighth step of injecting sole, in which the semi-finished product is fit to a multi-segment last of an injection apparatus and a first mold member, a second mold member, and a third mold member are closed to enclose the semi-finished product, such that after the third mold member is closed, a sole gap is formed between a third mold cavity of the third mold member and the midsole of the semi-finished product; and a sole material that is heated and melted is injected into the third mold cavity of the third mold member to form a sole, wherein the sole material that is injected into the third mold cavity combines with the midsole and covers a joint interface between the midsole and the vamp section so that after being cooled, a product is formed and removed to form a light-weight waterproof boot product.

9. The method for manufacturing a light-weight waterproof boot according to claim 8, wherein the multi-segment last comprises a shaft section, a vamp section, a heel section, and a sole section and the multi-segment last is formed by combining three separate sections including a first slidable section, a second slidable section, and a non-slidable section, wherein the non-slidable section of the multi-segment last is fixed and securely mounted to the injection apparatus; the first slidable section comprises a part of the vamp section and a part of the shaft section of the last, the first slidable section and the non-slidable section having contact surfaces that are in surface engagement with each other and are inclined and are provided with a slide rack and a slide channel that are in mating engagement with each other arranged therebetween, so that the first slidable section is reciprocally movable on the non-slidable section with the slide rack and the slide channel provided therebetween being arranged to incline downward in a direction from the shaft section toward the sole section, so that when the first slidable section moves in a direction toward the sole section, the first slidable section gradually reduces a vertical position thereof relative to get approaching to the second slidable section; and the second slidable section corresponds to the heel section of the last, the second slidable section and the non-slidable section having contact surfaces that are in surface engagement with each other and are inclined and are provided with a slide rack and a slide channel that are in mating engagement with each other arranged therebetween, so that the second slidable section is reciprocally movable on the non-slidable section with the slide rack and the slide channel provided therebetween being arranged to incline upward in a direction from the shaft section toward the sole section, so that when the second slidable section moves in a direction toward the sole section, the second slidable section gradually raises a vertical position thereof relative to get approaching to the first slidable section.

10. The method for manufacturing a light-weight waterproof boot according to claim 8, wherein the cutting operation of the first step is conducted to further make one to multiple shaft decorative plates; in the second step, the shaft decorative plates are arranged and stacked on the shaft water-resistant plate; and in the third step, the hot-melt adhesive layer on the back sides of the shaft decorative plates is heated and melted to combine with the shaft water-resistant plate as a unitary combination.

11. The method for manufacturing a light-weight waterproof boot according to claim 8, wherein the waterproof leather comprises rubber-made waterproof leather.

12. The method for manufacturing a light-weight waterproof boot according to claim 8, wherein the waterproof leather comprises plastics-made waterproof leather.

13. The method for manufacturing a light-weight waterproof boot according to claim 8, wherein the sole material comprises rubber.

14. The method for manufacturing a light-weight waterproof boot according to claim 8, wherein the sole material comprises polyurethane (PU).

15. The method for manufacturing a light-weight waterproof boot according to claim 12, wherein the plastics-made waterproof leather comprises thermoplastic polyurethane (TPU).

16. The method for manufacturing a light-weight waterproof boot according to claim 12, wherein the plastics-made waterproof leather comprises thermoplastic elastomer (TPE).

* * * * *